US012167370B2

(12) United States Patent
Ryu et al.

(10) Patent No.: US 12,167,370 B2
(45) Date of Patent: Dec. 10, 2024

(54) RESOURCE SELECTION WITH SIDELINK DEMODULATION REFERENCE SIGNAL (DMRS) BUNDLING

(71) Applicant: QUALCOMM Incorporated, San Diego, CA (US)

(72) Inventors: Jung Ho Ryu, Fort Lee, NJ (US); Sony Akkarakaran, Poway, CA (US); Tao Luo, San Diego, CA (US); Junyi Li, Fairless Hills, PA (US); Xiaojie Wang, Hillsborough, NJ (US); Peter Gaal, San Diego, CA (US); Juan Montojo, San Diego, CA (US); Wooseok Nam, San Diego, CA (US); Tianyang Bai, Somerville, NJ (US); Hua Wang, Basking Ridge, NJ (US); Piyush Gupta, Bridgewater, NJ (US); Jing Sun, San Diego, CA (US); Xiaoxia Zhang, San Diego, CA (US); Yan Zhou, San Diego, CA (US); Mahmoud Taherzadeh Boroujeni, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 486 days.

(21) Appl. No.: 17/449,045

(22) Filed: Sep. 27, 2021

(65) Prior Publication Data

US 2023/0101476 A1    Mar. 30, 2023

(51) Int. Cl.
*H04W 72/02*    (2009.01)
*H04L 5/00*    (2006.01)
(Continued)

(52) U.S. Cl.
CPC .......... *H04W 72/02* (2013.01); *H04L 5/0051* (2013.01); *H04L 5/0053* (2013.01);
(Continued)

(58) Field of Classification Search
CPC ..... H04W 72/20; H04W 72/02; H04W 72/23; H04W 72/21; H04L 5/0051
See application file for complete search history.

(56) References Cited

U.S. PATENT DOCUMENTS

2016/0029333 A1 * 1/2016 Seo .......................... H04J 11/00
370/350
2019/0222380 A1 * 7/2019 Manolakos ......... H04L 25/0224
(Continued)

FOREIGN PATENT DOCUMENTS

WO    WO-2021108383 A1    6/2021
WO    WO-2021126887 A1    6/2021

OTHER PUBLICATIONS

International Search Report and Written Opinion—PCT/US2022/075456—ISA/EPO—Nov. 11, 2022.

*Primary Examiner* — Kwang B Yao
*Assistant Examiner* — Bradley D Lytle, Jr.
(74) *Attorney, Agent, or Firm* — Norton Rose Fulbright US LLP/Qualcomm Incorporated

(57) ABSTRACT

Systems, methods, and devices for wireless communication that support resource selection and indication for sidelink demodulation reference signal (DMRS) bundling. A transmitting UE determines sidelink resources for bundling a sidelink DMRS transmission to be transmitted to a receiving UE. In sidelink mode 1, the sidelink resources may be determined based on indications from a base station, which may include whether the transmitting UE is to maintain phase continuity over the sidelink resources during the bundling, or whether the transmitting UE is to include a phase jump reference signal with the bundled DMRS trans-
(Continued)

mission to the receiving UE. In sidelink mode 2, the transmitting UE may select the sidelink resources based on the phase continuity capabilities of the transmitting UE and/or of the receiving UE, and/or based on a sensing of the sidelink channel. In some cases, the receiving UE may provide a resource recommendation to the transmitting UE.

30 Claims, 8 Drawing Sheets

(51) Int. Cl.
*H04W 72/20* (2023.01)
*H04W 72/21* (2023.01)
*H04W 72/23* (2023.01)
*H04W 76/23* (2018.01)

(52) U.S. Cl.
CPC ........... *H04L 5/0094* (2013.01); *H04W 72/20* (2023.01); *H04W 72/21* (2023.01); *H04W 72/23* (2023.01); *H04W 76/23* (2018.02)

(56) References Cited

U.S. PATENT DOCUMENTS

| | | | |
|---|---|---|---|
| 2019/0306923 A1* | 10/2019 | Xiong | H04J 13/0062 |
| 2020/0178221 A1* | 6/2020 | Byun | H04W 72/23 |
| 2020/0322095 A1* | 10/2020 | Park | H04L 1/1893 |
| 2021/0297221 A1* | 9/2021 | Lee | H04L 5/0053 |

\* cited by examiner

RESOURCE SELECTION WITH SIDELINK DEMODULATION REFERENCE SIGNAL (DMRS) BUNDLING

TECHNICAL FIELD

Aspects of the present disclosure relate generally to wireless communication systems, and more particularly, to resource selection and indication for sidelink demodulation reference signal (DMRS) bundling in a wireless communication system.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources.

A wireless communication network may include several components. These components may include wireless communication devices, such as base stations (or node Bs) that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on a downlink to a UE or may receive data and control information on an uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication performed by a user equipment (UE) includes determining a plurality of sidelink resources to be used for bundling a sidelink demodulation reference signal (DMRS) transmission to another UE, transmitting a sidelink control information (SCI) message to the another UE including an indication of a DMRS bundling configuration used for the bundled sidelink DMRS transmission, and transmitting the bundled sidelink DMRS transmission to the another UE over the plurality of sidelink resources.

In an additional aspect of the disclosure, a method of wireless communication performed by a UE includes receiving an SCI message from another UE including an indication of a DMRS bundling configuration used for a sidelink DMRS transmission over a plurality of sidelink resources from the another UE to the UE. In aspects, the DMRS bundling configuration specifies whether DMRS bundling is used in the bundled sidelink DMRS transmission over the plurality of sidelink resources. The method further includes receiving the bundled sidelink DMRS transmission from the another UE over the plurality of sidelink resources.

In an additional aspect of the disclosure, a method of wireless communication performed by a base station includes receiving, from a transmitting UE configured for sidelink communications with a receiving UE, a request for sidelink resources to be used by the transmitting UE for bundling a sidelink DMRS transmission to the receiving UE, configuring a plurality of sidelink resources to be used for the bundling of the sidelink DMRS transmission, and transmitting, to the transmitting UE, a transmission grant granting the plurality of sidelink resources to the transmitting UE for transmitting the bundled sidelink DMRS transmission to the receiving UE.

In an additional aspect of the disclosure, a UE includes at least one processor and a memory coupled to the at least one processor. The at least one processor stores processor-readable code that, when executed by the at least one processor, is configured to perform operations including determining a plurality of sidelink resources to be used for bundling a sidelink DMRS transmission to another UE, transmitting an SCI message to the another UE including an indication of a DMRS bundling configuration used for the bundled sidelink DMRS transmission, and transmitting the bundled sidelink DMRS transmission to the another UE over the plurality of sidelink resources.

In an additional aspect of the disclosure, a UE includes at least one processor and a memory coupled to the at least one processor. The at least one processor stores processor-readable code that, when executed by the at least one processor, is configured to perform operations including receiving an SCI message from another UE including an indication of a DMRS bundling configuration used for a sidelink DMRS transmission over a plurality of sidelink resources from the another UE to the UE. In aspects, the DMRS bundling configuration specifies whether DMRS bundling is used in the bundled sidelink DMRS transmission over the plurality of sidelink resources. The method further includes receiving the bundled sidelink DMRS transmission from the another UE over the plurality of sidelink resources.

In an additional aspect of the disclosure, a base station includes at least one processor and a memory coupled to the at least one processor. The at least one processor stores processor-readable code that, when executed by the at least one processor, is configured to perform operations including receiving, from a transmitting UE configured for sidelink communications with a receiving UE, a request for sidelink resources to be used by the transmitting UE for bundling a sidelink DMRS transmission to the receiving UE, configuring a plurality of sidelink resources to be used for the bundling of the sidelink DMRS transmission, and transmitting, to the transmitting UE, a transmission grant granting the plurality of sidelink resources to the transmitting UE for transmitting the bundled sidelink DMRS transmission to the receiving UE.

In an additional aspect of the disclosure, a non-transitory computer-readable medium stores instructions that, when executed by a processor, cause the processor to perform operations. The operations include determining, by a UE, a plurality of sidelink resources to be used for bundling a sidelink DMRS transmission to another UE, and transmitting, by the UE, an SCI message to the another UE including an indication of a DMRS bundling configuration used for the bundled sidelink DMRS transmission; and transmitting the bundled sidelink DMRS transmission to the another UE over the plurality of sidelink resources.

In an additional aspect of the disclosure, a non-transitory computer-readable medium stores instructions that, when executed by a processor, cause the processor to perform operations. The operations include receiving, by a UE, an SCI message from another UE including an indication of a DMRS bundling configuration used for a sidelink DMRS transmission over a plurality of sidelink resources from the another UE to the UE. In aspects, the DMRS bundling configuration specifies whether DMRS bundling is used in the bundled sidelink DMRS transmission over the plurality of sidelink resources. The operations further include receiving, by the UE, the bundled sidelink DMRS transmission from the another UE over the plurality of sidelink resources.

In an additional aspect of the disclosure, a non-transitory computer-readable medium stores instructions that, when executed by a processor, cause the processor to perform operations. The operations include receiving, by a base station from a transmitting UE configured for sidelink communications with a receiving UE, a request for sidelink resources to be used by the transmitting UE for bundling a sidelink DMRS transmission to the receiving UE, configuring a plurality of sidelink resources to be used for the bundling of the sidelink DMRS transmission, and transmitting, to the transmitting UE, a transmission grant granting the plurality of sidelink resources to the transmitting UE for transmitting the bundled sidelink DMRS transmission to the receiving UE.

In an additional aspect of the disclosure, an apparatus includes means for determining, by a UE, a plurality of sidelink resources to be used for bundling a sidelink DMRS transmission to another UE, and means for transmitting, by the UE, an SCI message to the another UE including an indication of a DMRS bundling configuration used for the bundled sidelink DMRS transmission; and transmitting the bundled sidelink DMRS transmission to the another UE over the plurality of sidelink resources.

In an additional aspect of the disclosure, an apparatus includes means for receiving, by a UE, an SCI message from another UE including an indication of a DMRS bundling configuration used for a sidelink DMRS transmission over a plurality of sidelink resources from the another UE to the UE. In aspects, the DMRS bundling configuration specifies whether DMRS bundling is used in the bundled sidelink DMRS transmission over the plurality of sidelink resources. The apparatus further includes means for receiving, by the UE, the bundled sidelink DMRS transmission from the another UE over the plurality of sidelink resources.

In an additional aspect of the disclosure, an apparatus includes means for receiving, by a base station from a transmitting UE configured for sidelink communications with a receiving UE, a request for sidelink resources to be used by the transmitting UE for bundling a sidelink DMRS transmission to the receiving UE, means for configuring a plurality of sidelink resources to be used for the bundling of the sidelink DMRS transmission, and means for transmitting, to the transmitting UE, a transmission grant granting the plurality of sidelink resources to the transmitting UE for transmitting the bundled sidelink DMRS transmission to the receiving UE.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like reference numbers and designations in the various drawings indicate like elements.

DETAILED DESCRIPTION

Figure 1:
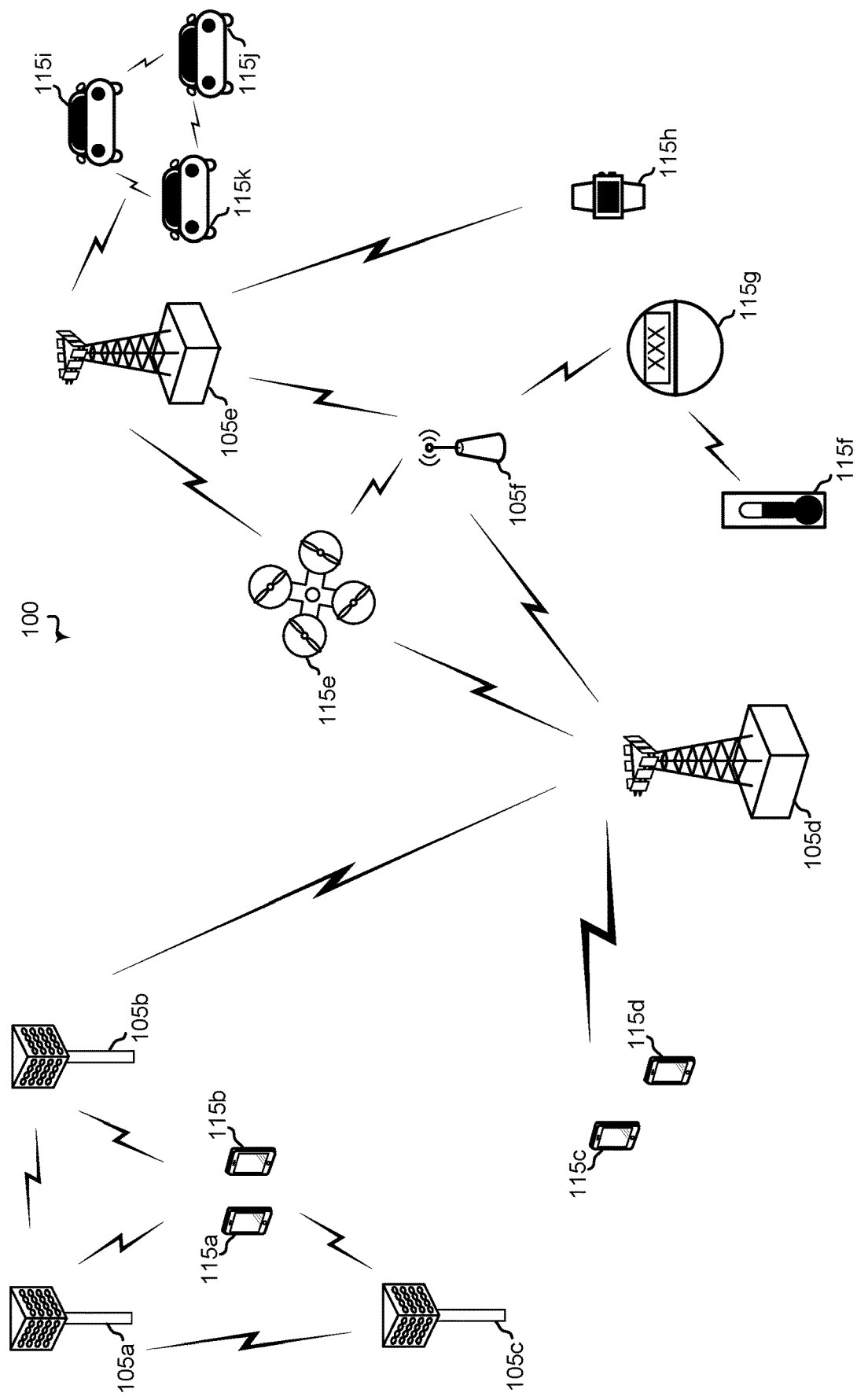
FIG. 1 is a block diagram illustrating details of an example wireless communication system according to one or more aspects.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project which was aimed at improving UMTS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

FIG. 1 is a block diagram illustrating details of an example wireless communication system according to one or more aspects. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" may refer to this particular geographic coverage area of a base station or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an IoT or "Internet of everything" (IoE) device such as an automotive or other transportation vehicle, a satellite radio, a global positioning system (GPS) device, a global navigation satellite system (GNSS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 100 may occur using wired or wireless communication links.

In operation at wireless network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD communications or low-latency FDD communications, such as in a vehicle-to-vehicle (V2V) mesh network between UEs 115i-115k communicating with macro base station 105e.

Figure 2:
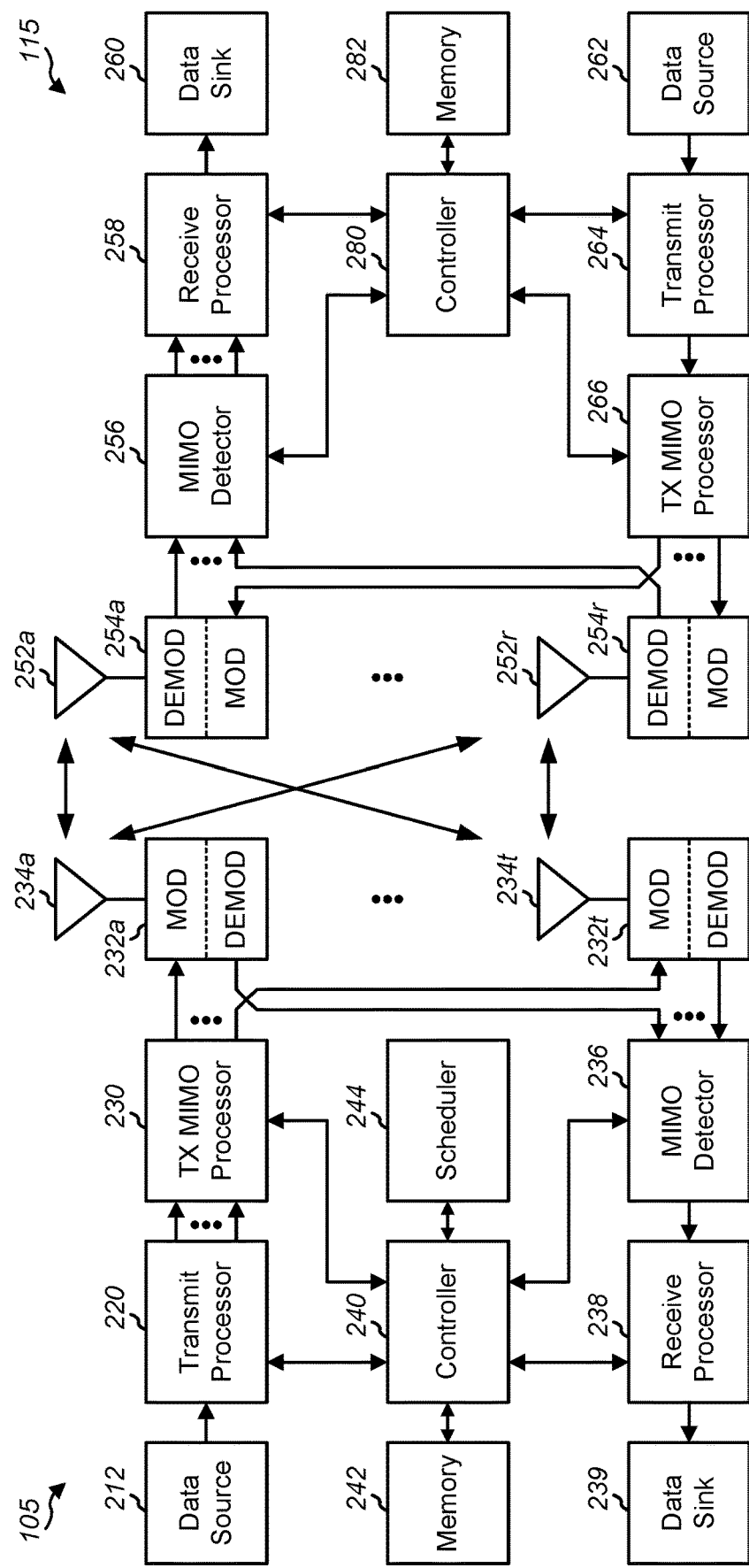
FIG. 2 is a block diagram illustrating examples of a base station and a user equipment (UE) according to one or more aspects.

FIG. 2 is a block diagram illustrating examples of base station 105 and UE 115 according to one or more aspects. Base station 105 and UE 115 may be any of the base stations and one of the UEs in FIG. 1. For a restricted association scenario (as mentioned above), base station 105 may be small cell base station 105f in FIG. 1, and UE 115 may be UE 115c or 115d operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from controller 240, such as a processor. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) MIMO processor 230 may perform spatial processing (e.g., precoding) on the data symbols, the control symbols, or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller 280, such as a processor.

On the uplink, at UE 115, transmit processor 264 may receive and process data (e.g., for a physical uplink shared channel (PUSCH)) from data source 262 and control information (e.g., for a physical uplink control channel (PUCCH)) from controller 280. Additionally, transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller 240.

Controllers 240 and 280 may direct the operation at base station 105 and UE 115, respectively. Controller 240 or other processors and modules at base station 105 or controller 280 or other processors and modules at UE 115 may perform or direct the execution of various processes for the techniques described herein, such as to perform or direct the execution illustrated in FIGS. 4-6, or other processes for the techniques described herein. Memories 242 and 282 may store data and program codes for base station 105 and UE 115, respectively. Scheduler 244 may schedule UEs for data transmission on the downlink or the uplink.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

Current implementations of wireless communication systems implement sidelink communications in which a UE communicates with other UEs directly over a sidelink. Sidelink communications between two UEs may operate in one of various modes. In particular, two modes for channel/resource allocation have been specified in current wireless communication system implementations. One such mode, also known as sidelink mode 2, involves a transmitting node autonomously scheduling sidelink transmissions to a receiving UE(s) over the sidelink without the transmitting UE obtaining a transmission grant from a serving base station before it is allowed to transmit to the receiving UE over the sidelink. In another mode, also known as sidelink mode 1, a base station may schedule the sidelink transmissions between the transmitting UE and the receiving UE(s). For example, in sidelink mode 1, a UE may transmit to another UE over the sidelink, but the transmitting UE must obtain a transmission grant (e.g., in a downlink control information (DCI) message) from the serving base station before it is allowed to transmit to the receiving UE over the sidelink. In sidelink mode 1, without a transmission grant, the transmitting UE is not allowed to transmit to the receiving UE over the sidelink. However, once the base station grants the transmission grant to the transmitting UE, the transmitting UE may transmit to the receiving UE over the sidelink.

In implementations, the sidelink transmission may follow a particular scheme. For example, the transmitting UE may transmit control information in a sidelink control information (SCI) message (included in a physical sidelink control channel (PSCCH) transmission) to the receiving UE. The receiving UE may use the control information in the SCI to receive and/or to decode a data transmission (e.g., a physical sidelink shared channel (PSSCH) transmission) from the transmitting UE.

In current sidelink implementations, a sidelink demodulation reference signal (DMRS) may be transmitted in combination with PSCCH transmissions and/or the PSSCH transmissions. The sidelink DMRS may be transmitted from a transmitting UE to a receiving UE, and may enable and/or facilitate the receiving UE to perform channel estimation and to decode information. For example, the sidelink DMRS may be transmitted in a PSCCH transmission. In this case, the sidelink DMRS may be included in every PSCCH symbol and may be placed in a pattern that includes every fourth resource element (RE). The sidelink DMRS in the PSCCH may follow or be based on a Gold sequence. In another example, the sidelink DMRS may be transmitted in a PSSCH transmission. In this case, DMRS patterns that include two, three, and four symbol DMRS patterns maybe configured to be used by the transmitting UE. The transmitting UE may select a DMRS symbol pattern and may signal the selected DMRS symbol pattern to the receiving UE in the SCI message (e.g., in the SCS1 or first-stage SCI). In some cases, a configuration type 1 may be used for frequency domain patterns to be used for DMRS in the PSSCH transmission. The sidelink DMRS in the PSSCH may follow or be based on a Gold sequence.

In implementations, the sidelink DMRS transmissions may be bundled. Sidelink DMRS bundling may include a receiving UE performing joint channel estimation based on the identical sidelink DMRS transmissions received across multiple resources (e.g., slots) of a sidelink DMRS window, instead of performing channel estimation separately for each individual slot based on the sidelink DMRS transmission received over the individual slot. In this manner, a receiving UE may use the number of bundled sidelink DMRS transmissions, which may include sidelink DMRS transmissions over a plurality of slots or a sidelink DMRS bundling window, to better estimate the channel. Sidelink DMRS bundling may be useful in a situation in which the receive signal-to-noise ratio (SNR) may be too low to accurately estimate the channel using the sidelink DMRS transmitted in one slot. In this case, using the sidelink DMRS transmission of multiple slots may yield a more accurate estimate of the channel.

However, current implementations of sidelink DMRS bundling may only work if the channel to be estimated does not change over the plurality of slots over which the sidelink DMRS is bundled (e.g., the sidelink DMRS window). If the channel changes (e.g., if the channel is different in a first slot over which a DMRS is transmitted than in a second slot over which another DMRS is transmitted), then sidelink DMRS bundling does not work. As such, current implementations of sidelink DMRS bundling assume that the channel does not change within the sidelink DMRS bundling window. Because of this limitation, current implementations of sidelink DMRS bundling may be beneficial in low mobility scenarios where the sidelink channel changes slowly (e.g., due to low Doppler). However, current implementations of sidelink DMRS bundling with a multi-slot bundling window may not be as advantageous in a high mobility scenario (e.g., vehicle to everything (V2X)) due to the fact that the communication channel in this scenario may be fast changing (e.g., due to high Doppler).

One of the reasons that current implementations of sidelink DMRS bundling may not work on a changing channel may be due to the break in phase continuity. For example, suppose that a transmitting UE transmits a same OFDM symbol in two slots, $v_1(t)$ and $v_2(t)$. If the phase in $v_1(t)$ (e.g., $\phi_1$) is the same as the phase in $v_2(t)$ (e.g., $\phi_2$), then it is said that the transmitting UE maintains phase continuity over the transmission over the two slots $v_1(t)$ and $v_2(t)$. However, if the phase in $v_1(t)$ (e.g., $\phi_1$) is different from the phase in $v_2(t)$ (e.g., $\phi_2$), then it is said that the transmitting UE has experienced a phase jump of $\phi_2-\phi_1$ from slot $v_1(t)$ to slot $v_2(t)$. With the phase jump of $\phi_2-\phi_1$, the received signals $v_1(t)$ and $v_2(t)$ may not be identical, and hence joint channel estimation based on DMRS of $v_1(t)$ and DMRS of $v_2(t)$ may not be possible without an additional step of removing the phase jump.

During any particular slot, the RF component of a UE may introduce a random phase term (e.g., $\phi_1$ or $\phi_2$). However, even if the phase terms introduced by the RF component of a UE are random, the phase terms may be the same over several slots (e.g., several consecutive slots). If the phase terms over several slots are the same, the UE is said to maintain phase continuity over the several slots. Some UEs may be capable of maintaining phase continuity (under certain conditions), while some UEs may not be able to maintain phase continuity. The same principles of maintain phase continuity may apply to transmitting UEs as well as to receiving UE in a sidelink implementation. For example, the RF component at the receiving UE may introduce random phase terms when receiving transmissions from the transmitting UE over a sidelink. It is noted that the different random phase terms during different slots may not pose a problem if channel estimation is performed separately and/or independently for the several slots. For example, if the channel is estimated during a first slot of the several slots, and if the channel is estimated during a second slot of the several slots independently or separately from the channel estimation during the first slot, then the fact that the random phase term of the first slot is different than the phase term of the second slot would not be a problem for sidelink DMRS bundling. Different random phase terms become a problem for sidelink DMRS bundling when the channel is to be estimated jointly over the several slots.

In aspects, ensuring that the random phase terms in the transmission or reception of the DMRS transmission do not cause a problem for DMRS bundling may include maintaining phase continuity (e.g., by the transmitting UE and/or the receiving UE) over the DMRS bundling window, and/or providing a phase jump reference signal that may be used to estimate a phase jump over the DMRS bundling window by the receiving UE.

Various aspects of the present disclosure are directed to systems and methods that support resource selection and indication for sidelink DMRS bundling in a wireless communication system. In aspects, a transmitting UE may be determine a plurality of sidelink resources to be used for bundling a sidelink DMRS transmission to be transmitted to a receiving UE. For example, the transmitting UE may determine a plurality of slots over which to bundle the sidelink DMRS transmissions to the receiving UE. In aspects, determining the plurality of sidelink resources over which to bundle the DMRS transmissions to the receiving UE may include two modes of resource determination, mode 1 (in which a base station selects the sidelink DMRS bundling resources) and mode 2 (in which the sidelink UE select the sidelink DMRS resources). In mode 1, the plurality of sidelink resources (e.g., plurality of slots) over which to bundle the sidelink DMRS transmission may be determined by the transmitting UE based on a plurality of sidelink resources indicated in a transmission grant received from a base station. The transmission grant from the base station may include whether the transmitting UE is to maintain phase continuity over the plurality of sidelink resources during the sidelink DMRS bundling, or whether the transmitting UE is to include a phase jump reference signal with the bundled DMRS transmission to the receiving UE. In mode 2, the transmitting UE may select the plurality of sidelink resources over which to bundle the sidelink DMRS transmissions to the receiving UE. In these cases, the transmitting UE may select the plurality of sidelink resources based on the phase continuity capabilities of the transmitting UE and/or the phase continuity capability of the receiving UE, and/or based on a sensing of the sidelink channel performed by the transmitting UE. In some cases, the receiving UE may transmit a sidelink resource recommendation to the transmitting UE, and the transmitting UE may select the sidelink resources over which to bundle the sidelink DMRS transmission based on the sidelink resource recommendation from the receiving UE. The sidelink resource recommendation may include an indication from the receiving UE of which sets of sidelink resources the receiving UE may be able to use while maintaining phase continuity, and/or an indication of which sets of sidelink resources the receiving UE may not be able to maintain phase continuity while receiving the DMRS transmission.

In aspects, the transmitting UE may transmit an SCI to the receiving UE indicating whether sidelink DMRS bundling is enabled, and/or whether phase continuity is maintained over the sidelink DMRS bundling window and/or whether a phase jump reference signal is transmitted for the sidelink DMRS bundling window.

Figure 3:
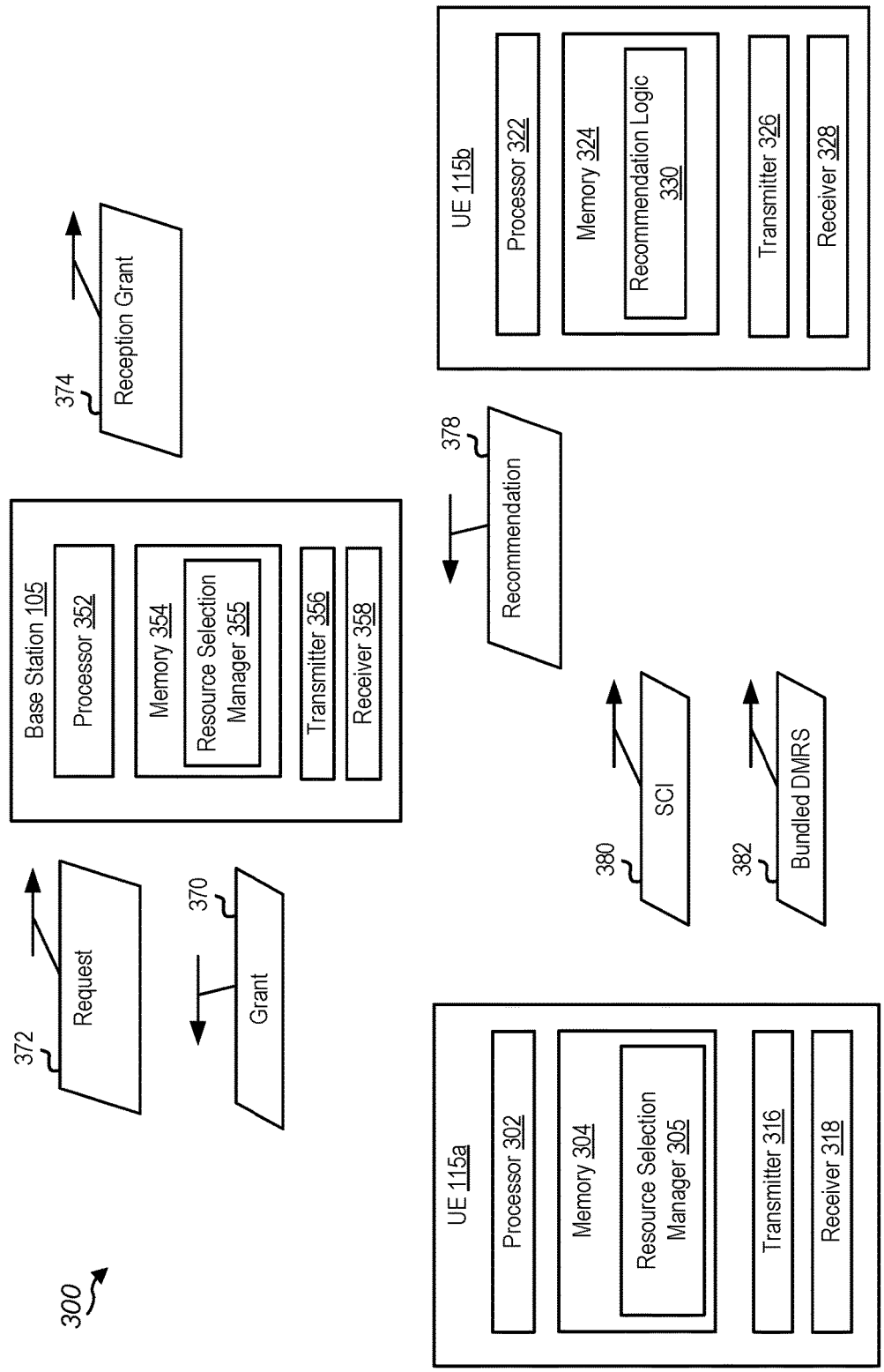
FIG. 3 is a block diagram illustrating an example wireless communication system that supports resource selection and indication for sidelink demodulation reference signal (DMRS) bundling in a wireless communication system according to one or more aspects.

FIG. 3 is a block diagram of an example wireless communications system 300 that supports resource selection and indication for sidelink DMRS bundling in a wireless communication system according to one or more aspects of the present disclosure. In some examples, wireless communications system 300 may implement aspects of wireless network 100. Wireless communications system 300 includes UE 115a, UE 115b, and base station 105, and may implement a sidelink communication scheme (e.g., sidelink mode 1 or sidelink mode 2). In aspects, UE 115a and UE 115b may be in communication over a sidelink. In some aspects, UE 115a and UE 115b may also each be in communication with base station 105, and may operate in sidelink mode 1. In the discussion that follows, UE 115a may be described as a transmitting UE and UE 115b may be described as a receiving UE, and in this context UE 115a may transmit data to UE 115b (e.g., SCI messages, bundled DMRS transmissions, PSCCH transmissions, PSSCH transmissions, etc.). However, this description of UE 115a as a transmitting UE and UE 115b as a receiving UE, as well as the description of system 300 as including two UEs and one base station, is merely for illustrative purposes and not intended to be limiting in any way. As such, wireless communications system 300 may generally include additional transmitting UEs and/or receiving UEs, and may include more than one base station 105.

UE 115a may include a variety of components (such as structural, hardware components) used for carrying out one or more functions described herein. For example, these components may include one or more processors 302 (hereinafter referred to collectively as "processor 302"), one or more memory devices 304 (hereinafter referred to collectively as "memory 304"), one or more transmitters 316 (hereinafter referred to collectively as "transmitter 316"), and one or more receivers 318 (hereinafter referred to collectively as "receiver 318"). Processor 302 may be configured to execute instructions stored in memory 304 to perform the operations described herein. In some implementations, processor 302 includes or corresponds to one or more of receive processor 258, transmit processor 264, and controller 280, and memory 304 includes or corresponds to memory 282.

Memory 304 includes or is configured to store resource selection manager 305. In aspects, resource selection manager 305 may be configured to perform operations for determining a plurality of sidelink resources to be used for bundling a sidelink DMRS transmission (e.g., bundled DMRS transmission 382) to be transmitted to UE 115b (e.g., the receiving UE) in accordance with aspects of the present disclosure. In some aspects, such as in mode 1 implementations, resource selection manager 305 may operate to determine the plurality of sidelink resources to be used for bundling a sidelink DMRS transmission based on a transmission grant (e.g., transmission grant 370) received from a base station (e.g., base station 105). In aspects, such as in mode 2 implementations, resource selection manager 305 may operate to determine the plurality of sidelink resources to be used for bundling a sidelink DMRS transmission based on sensing information obtained by UE 115a, based on the phase continuity of UE 115a and/or UE 115b, and/or based on a recommendation received from receiving UE 115b.

Transmitter 316 is configured to transmit reference signals, control information and data to one or more other devices, and receiver 318 is configured to receive references signals, synchronization signals, control information and data from one or more other devices. For example, transmitter 316 may transmit signaling, control information and data to, and receiver 318 may receive signaling, control information and data from, base station 105. In some implementations, transmitter 316 and receiver 318 may be integrated in one or more transceivers. Additionally or alternatively, transmitter 316 or receiver 318 may include or correspond to one or more components of UE 115 described with reference to FIG. 2.

UE 115b also may include a variety of components (such as structural, hardware components) used for carrying out one or more functions described herein. For example, these components may include one or more processors 322 (hereinafter referred to collectively as "processor 322"), one or more memory devices 324 (hereinafter referred to collectively as "memory 324"), one or more transmitters 326 (hereinafter referred to collectively as "transmitter 326"), and one or more receivers 328 (hereinafter referred to collectively as "receiver 328"). Processor 322 may be configured to execute instructions stored in memory 324 to perform the operations described herein. In some implementations, processor 322 includes or corresponds to one or more of receive processor 258, transmit processor 264, and controller 280, and memory 324 includes or corresponds to memory 282.

Memory 324 includes or is configured to store recommendation logic 330. In aspects, recommendation logic 330 may be configured to determine sets of sidelink resources over which receiving UE 115b may be able to receive from transmitting UE 115a while maintaining phase continuity and/or sets of sidelink resources over which receiving UE 115b may not be able to maintain phase continuity while receiving from transmitting UE 115a, and to indicate the determined sets of resources (e.g., able to maintain phase continuity, and not able to maintain phase continuity) to transmitting UE in a recommendation (e.g., recommendation 378) in accordance with aspects of the present disclosure.

Transmitter 326 is configured to transmit reference signals, control information and data to one or more other devices, and receiver 328 is configured to receive references signals, synchronization signals, control information and data from one or more other devices. For example, transmitter 326 may transmit signaling, control information and data to, and receiver 328 may receive signaling, control information and data from, base station 105. In some implementations, transmitter 326 and receiver 328 may be integrated in one or more transceivers. Additionally or alternatively, transmitter 326 or receiver 328 may include or correspond to one or more components of UE 115 described with reference to FIG. 2.

Base station 105 may include a variety of components (such as structural, hardware components) used for carrying out one or more functions described herein. For example, these components may include one or more processors 352 (hereinafter referred to collectively as "processor 352"), one or more memory devices 354 (hereinafter referred to collectively as "memory 354"), one or more transmitters 356 (hereinafter referred to collectively as "transmitter 356"), and one or more receivers 358 (hereinafter referred to collectively as "receiver 358"). Processor 352 may be configured to execute instructions stored in memory 354 to perform the operations described herein. In some implementations, processor 352 includes or corresponds to one or more of receive processor 238, transmit processor 220, and controller 240, and memory 354 includes or corresponds to memory 242.

Memory 354 includes or is configured to store resource selection manager 355. In aspects, resource selection manager 355 may be configured to perform operations for selecting a plurality of sidelink resources to be used for bundling a sidelink DMRS transmission (e.g., bundled DMRS transmission 382) to be transmitted from transmitting UE 115a to receiving UE 115b in accordance with aspects of the present disclosure. In some aspects, such as in mode 1 implementations, resource selection manager 355 may operate to determine the plurality of sidelink resources to be used for bundling a sidelink DMRS transmission based on a determination of the distance between sidelink resources (e.g., sidelink resources that are close to each other (e.g., consecutive resources) may not experience a channel change and may be easier to maintain phase continuity over). In some aspects, resources selection manager 355 may select resources, but may indicate to the transmitting UE 115a (e.g., in transmission grant 370) to use a phase jump reference signal in order to facilitate receiving UE 115b to estimate the phase jump between the sidelink resources.

Transmitter 356 is configured to transmit reference signals, synchronization signals, control information and data to one or more other devices, and receiver 358 is configured to receive reference signals, control information and data from one or more other devices. For example, transmitter 356 may transmit signaling, control information and data to, and receiver 358 may receive signaling, control information and data from, UE 115. In some implementations, transmitter 356 and receiver 358 may be integrated in one or more transceivers. Additionally or alternatively, transmitter 356 or receiver 358 may include or correspond to one or more components of base station 105 described with reference to FIG. 2.

In some implementations, wireless communications system 300 implements a 5G NR network. For example, wireless communications system 300 may include multiple 5G-capable UEs 115 and multiple 5G-capable base stations 105, such as UEs and base stations configured to operate in accordance with a 5G NR network protocol such as that defined by the 3GPP.

During operation of wireless communications system 300, such as in operations in mode 1, transmitting UE 115a transmits request 372 to base station 105 requesting sidelink resources for bundling a sidelink DMRS transmission to be transmitted to receiving UE 115b. In some aspects, request 372 may be included in a buffer status report (BSR). In aspects, request 372 may include an indication from transmitting UE 115a of a phase continuity capability of transmitting UE 115a. A phase continuity capability of a UE may indicate a number of sidelink resources over which the UE is able to maintain phase continuity. For example, a phase continuity of a transmitting UE may indicate a number of sidelink resources over which the UE is able to maintain phase continuity while transmitting to a receiving UE, and a phase continuity of a receiving UE may indicate a number of sidelink resources over which the UE is able to maintain phase continuity while receiving from a transmitting UE. Outside the phase continuity, the UE may not be able to maintain phase continuity. Base station 105 may use this indication to determine a set of sidelink resources over which transmitting UE 115a may transmit the bundled DMRS transmission while maintaining phase continuity, or whether a phase jump reference signal may be required to be transmitted by transmitting UE 115a to receiving UE 115b as base station may select a set of sidelink resources over which transmitting UE 115a may not be able to maintain phase continuity.

Request 372 may include an indication by transmitting UE 115a of a maximum size of the DMRS bundling window. For example, transmitting UE 115a may indicate, in request 372, a maximum number of sidelink resources over which the sidelink DMRS transmission to receiving UE 115b is to be bundled by the transmitting UE. Base station 105 may use this indication to select the plurality of resources that may accommodate the DMRS bundling window requested by transmitting UE 115a.

Base station 105 may select a plurality of sidelink resources configured for transmitting UE 115a to use for bundling the sidelink DMRS transmission to be transmitted to receiving UE 115b. For example, base station 105 may configure and/or schedule a set or plurality of sidelink resources to be used by transmitting UE 115a to transmit bundled sidelink DMRS transmission 382 to receiving UE 115b. In aspects, base station 105 may select the plurality of sidelink resources based on a determination that a distance between the sidelink resources of the selected plurality of sidelink resources is less than a threshold. For example, the distance (e.g., distance in time) between the sidelink resources of the selected plurality of sidelink resources may be close enough (e.g., may be consecutive sidelink resources) to ensure that the sidelink channel does not change between the sidelink resources of the selected plurality of sidelink resources. In aspects, the sidelink resources of the selected plurality of sidelink resources may be in the same frequency domain, may have the same center frequency, and/or may have the same bandwidth. In this manner, base station 105 may ensure that transmitting UE 115a may transmit the entire bundled sidelink DMRS transmission without the channel changing, and without a phase jump in the sidelink DMRS bundling window.

In some aspects, base station 105 may select the plurality of sidelink resources based on the indication from UE 115 of the phase continuity capability of transmitting UE 115a (and/or in some aspects additionally or alternatively based on the phase continuity capability of receiving UE 115b). For example, base station 105 may receive, from transmitting UE 115a and/or receiving UE 115b, and identification of the receiving UE 115b, the phase continuity capability of transmitting UE 115a, the phase continuity capability of receiving UE 115b, etc. Base station 105 may determine a set of resources that may be suitable for transmission of the bundled sidelink DMRS transmission from transmitting UE 115a and reception by receiving UE 115b without a phase jump (e.g., while maintaining phase continuity by transmitting UE 115a and receiving UE 115b).

During operation of wireless communications system 300, such as in operations in mode 1, base station 105 may transmit transmission grant 370 granting the selected plurality of sidelink resources to transmitting UE 115a for bundling the sidelink DMRS transmission to receiving UE 115b. In aspects, transmission grant 370 may include an indication of the plurality of sidelink resources granted to transmitting UE 115a. Transmission grant 370 may additionally or alternatively include an indication to transmitting UE 115a to maintain phase continuity over the bundled sidelink DMRS transmission to receiving UE 115b over the plurality of sidelink resources. For example, the plurality of sidelink resources may include sidelink resources that base station 105 may determine are suitable for maintaining phase continuity (e.g., may be sidelink resources that are consecutive). In this case, base station 105 may indicate to transmitting UE 115a to maintain phase continuity over these sidelink resources.

In some aspects, transmission grant 370 may additionally or alternatively include an indication to transmitting UE 115a to include a phase jump reference signal in a DMRS bundling configuration that is transmitted to receiving UE 115b, and that receiving UE 115b may use to determine the configuration of the bundled sidelink DMRS transmission (e.g., the DMRS bundling configuration may indicate whether DMRS bundling is enabled, whether phase continuity is maintained by transmitting UE 115a during the bundled DMRS transmission, whether a phase jump reference signal is included, and indication of the phase jump reference signal, etc.). Receiving UE 115b may use the jump reference signal to estimate a phase jump associated with the bundled sidelink DMRS transmission. For example, receiving UE 115b may use the phase jump reference signal to estimate a phase jump between the sidelink resources of the plurality of sidelink resources. In these cases, the plurality of sidelink resources may include sidelink resources that base station 105 may determine are suitable for bundling the sidelink DMRS transmission, but may not be suitable for maintaining phase continuity (e.g., may be sidelink resources that are not consecutive or are separated by a distance greater than the predetermined threshold). In this case, base station 105 may indicate to transmitting UE 115a to include a phase jump reference signal, and transmitting UE 115 may not have to maintain phase continuity during the plurality of sidelink resources.

Transmitting UE 115 may select the sidelink DMRS bundling window from the plurality of sidelink resources granted by base station 105. In some aspects, the sidelink DMRS bundling window may include all the granted sidelink resources in the plurality of sidelink resources, or may include a subset of the granted sidelink resources in the plurality of sidelink resources.

In aspects, base station 105 may also transmit reception grant 374 to receiving UE 115b. Reception grant 374 may include granted resources over which receiving UE 115b may receive a sidelink transmission from transmitting UE 115a. Reception grant 374 may also include an indication to receiving UE 115b that the sidelink transmission from transmitting UE 115a includes a bundled sidelink DMRS transmission, and that the bundled sidelink DMRS transmissions is bundled over the granted resources. In this manner, receiving UE 115b may be made aware that a bundled sidelink DMRS transmission may be received from transmitting UE 115a. In these cases, an SCI message (e.g., SCI message 380) may still be received from transmitting UE 115 explicitly indicating that the associated transmission may include a bundled sidelink DMRS transmission. In some aspects, the SCI message received from transmitting UE 115a may preempt the reception grant 374 received from base station 105.

During operation of wireless communications system 300, such as in operations in mode 2, transmitting UE 115a and receiving UE 115b may cooperatively operate to ensure that bundled sidelink DMRS transmission 382 may be transmitted from transmitting UE 115a and received by receiving UE 115b within the phase continuity capability of each of transmitting UE 115a and receiving UE 115b. If bundled sidelink DMRS transmission 382 is not transmitted and/or received within the phase continuity capability of transmitting UE 115a and receiving UE 115b, a phase jump reference signal may be included (e.g., in SCI message 380 from transmitting UE 115a to receiving UE 115b) to enable receiving UE 115b to estimate the phase jump between the sidelink resources in the sidelink DMRS bundling window and be able to estimate the sidelink channel.

In some aspects of operations in mode 2 in accordance with aspects of the present disclosure, receiving UE 115b may transmit recommendation 378 to transmitting UE 115a. Recommendation 378 may be a recommendation by receiving UE 115b of one or more sidelink resources that may be configured for receiving UE 115*b* to be used to receive the bundled sidelink DMRS transmission from transmitting UE 115*a*. The one or more sidelink resources may be resources that are suitable for receiving UE 115*b* to receive the bundled sidelink DMRS transmission. In some aspects, the one or more sidelink resources in recommendation 378 may include an indication of sidelink resources of the one or more sidelink resources over which receiving UE 115*b* may be able to receive the bundled sidelink DMRS transmission while maintaining phase continuity. For example, these sidelink resources of the one or more sidelink resources may be sidelink resources during which receiving UE 115*b* is not to change its RF configuration, or may be sidelink resources over which receiving UE 115*b* is not scheduled to receive or transmit to another UE (e.g., different than transmitting UE 115*a*).

In some aspects, the one or more sidelink resources in recommendation 378 may include an indication of sidelink resources of the one or more sidelink resources over which receiving UE 115*b* may not be able to receive the bundled sidelink DMRS transmission while maintaining phase continuity. For example, these sidelink resources of the one or more sidelink resources may be sidelink resources during which receiving UE 115*b* is to change its RF configuration, or may be sidelink resources over which receiving UE 115*b* is scheduled to receive or transmit to another UE (e.g., different than transmitting UE 115*a*). In these cases, receiving UE 115*b* may not be able to maintain phase continuity while receiving over these sidelink resources.

In some aspects, recommendation 378 may also include a commitment indication from receiving UE 115*b* indicating to transmitting UE 115*a* that receiving UE 115*b* commits to maintain phase continuity over the one or more sidelink resources indicated by receiving UE 115*b* as suitable for receiving the bundled sidelink DMRS transmission from transmitting UE 115*a*. In these cases, receiving UE 115*b* may keep the commitment to maintain phase continuity (e.g., commits to maintain its RF configuration unchanged during the one or more resources) and in this manner the commitment indication may serve as an indication that receiving UE 115*b* is willing to, or accepts, receive bundled sidelink DMRS transmission 382.

In aspects, transmitting UE 115*a* may select a sidelink DMRS bundling window (e.g., a plurality of resources over which to bundle the sidelink DMRS transmission) based at least in part on recommendation 378. For example, transmitting UE 115*a* may select a plurality of resources for the sidelink DMRS bundling window from the one or more sidelink resources indicated in recommendation 378 over which receiving UE 115*b* may be able to receive with phase continuity. In this manner, transmitting UE 115*a* may bundle the sidelink DMRS transmission and may ensure that receiving UE 115*b* may receive bundled DMRS transmission 382 without a phase jump. Transmitting UE 115*a* may also, or alternatively, rely upon the commitment indication from receiving UE 115*b* when selecting the sidelink DMRS bundling window, as transmitting UE 115*a* may know that receiving UE 115*b* may maintain its RF configuration unchanged and thus, be able to receive bundled DMRS transmission 382 without a phase jump. Additionally, or alternatively, transmitting UE 115*a* may select the sidelink DMRS bundling window based on a sensing of the sidelink channel. Additionally, or alternatively, transmitting UE 115*a* may select the sidelink DMRS bundling window based on its own phase continuity capability. In this case, transmitting UE 115*a* may select the sidelink DMRS bundling window to include sidelink resources over which transmitting UE 115*a* may determine, based on its own phase continuity capability, is able to transmit to receiving UE 115*b* while maintaining phase continuity.

In some aspects, transmitting UE 115*a* may select a sidelink DMRS bundling window to include sidelink resources over which either transmitting UE 115*a* and/or receiving UE 115*b* are not able to maintain phase continuity. In these cases, transmitting UE 115*a* may determine to transmit a phase jump reference signal to receiving UE 115*b* to ensure that receiving UE 115*b* is able to estimate the phase jump between the sidelink resources of the sidelink DMRS bundling window in order to be able to receive the bundled sidelink DMRS transmission 382 within channel coherence time. In aspects, channel coherence time may refer to a duration over which the channel does not change substantially.

In alternative aspects, receiving UE 115*b* may not transmit, or may forego to transmit, recommendation 378 to transmitting UE 115*a*. In these cases, transmitting UE 115*a* may select a sidelink DMRS bundling window based, at least in part, on the sensing performed by transmitting UE 115*a*, on the phase continuity capability of transmitting UE 115*a*, and/or on the phase continuity capability of receiving UE 115*b*.

During operations of wireless communications system 300, such as in operations in either mode 1 or mode 2, transmitting UE 115*a* may transmit bundled sidelink DMRS transmission 378 to receiving UE 115*b* over the sidelink resources of the sidelink DMRS window selected by transmitting UE 115*a*. For example, in mode 1 operations, the sidelink resources of the sidelink DMRS window may include resources selected by base station 105 and indicated to transmitting UE 115*a*, or in mode 2 operations, the sidelink resources of the sidelink DMRS window may include resources selected by transmitting UE 115*a* based on recommendation 378 from receiving UE 115*b* or selected by transmitting UE 115*a* based on its sensing, on the phase continuity capability of transmitting UE 115*a*, and/or on the phase continuity capability of receiving UE 115*b*.

In aspects, transmitting UE 115 may transmit SCI message 380, including a DMRS configuration for bundled sidelink DMRS transmission 382. The DMRS configuration for bundled sidelink DMRS transmission 382 may include an indication of whether bundled sidelink DMRS transmission 382 is bundled or not. In some aspects, the DMRS configuration for bundled sidelink DMRS transmission 382 may include an indication of whether transmitting UE 115*a* maintains phase continuity over the bundled sidelink DMRS transmission 382. For example, SCI message 380 may include an indication that bundled sidelink transmission 382 is transmitted to receiving UE 115*b* with phase continuity (e.g., without a phase jump) over the sidelink DMRS bundling window. In some cases, SCI message 380 may include an indication that bundled sidelink transmission 382 is not transmitted to receiving UE 115*b* with phase continuity, indicating that there is at least one phase jump over the sidelink DMRS bundling window. In this case, SCI message 380 may also include an indication that a phase jump reference signal is included in the transmission to receiving UE 115*b* to facilitate receiving UE 115*b* to estimate the least one phase jump over the sidelink DMRS bundling window.

In some aspects, such as in mode 2 operations without a recommendation from receiving UE 115*b*, SCI message 380 may also include an indication of whether sidelink DMRS bundling is enabled using a particular phase continuity capability. In this manner, receiving UE 115*b* may be able to determine if receiving UE 115*b*'s phase continuity capability is able to support receiving bundled sidelink DMRS transmission 382. In aspects, UE 115b may forego receiving bundled sidelink DMRS transmission 382 (e.g., when the phase continuity capability of receiving UE 115b is not the same (or less) than the phase continuity capability with which bundled sidelink DMRS transmission 382 is transmitted from transmitting UE 115a).

In some aspects, SCI message 380 may include a commitment indication from transmitting UE 115a indicating to receiving UE 115b that transmitting UE 115a commits to maintaining phase continuity over the transmission of bundled sidelink DMRS transmission 382. In these cases, transmitting UE 115a may keep the commitment to maintain phase continuity (e.g., commits to maintain its RF configuration unchanged during the one or more resources) and in this manner the commitment indication may serve as an indication to receiving UE 115b that bundled sidelink DMRS transmission 382 is transmitted without a phase jump during the sidelink DMRS bundling window.

Figure 4:
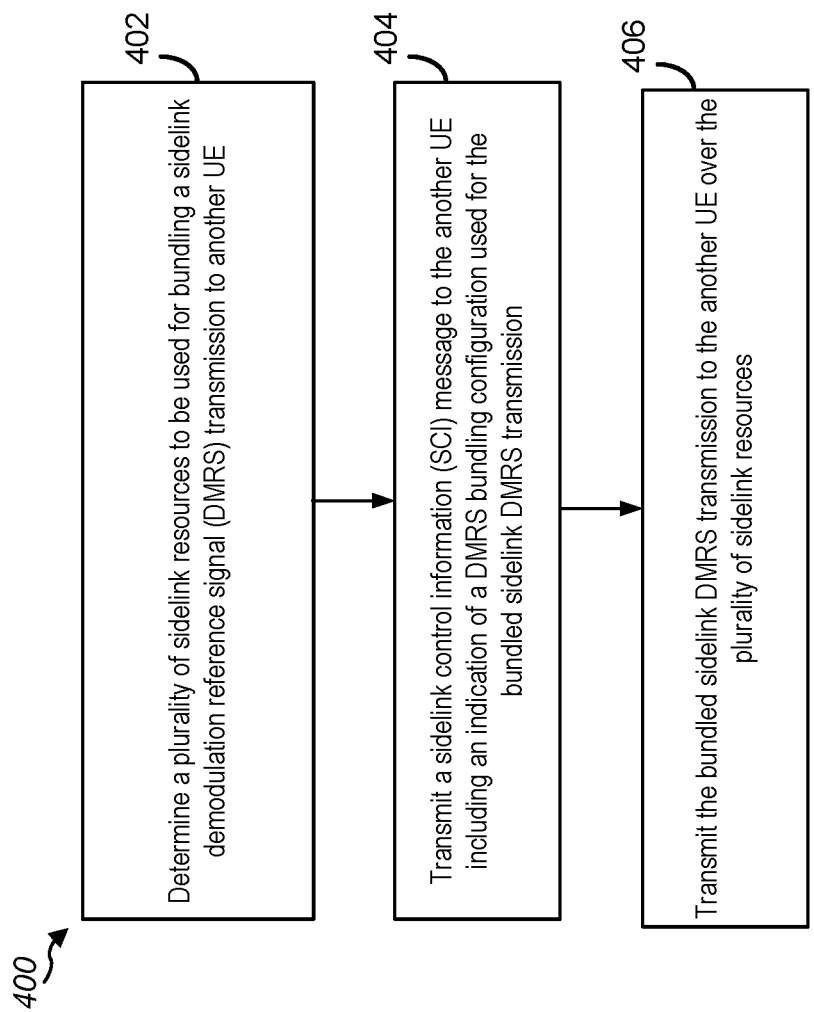
FIG. 4 is a flow diagram illustrating an example process that supports resource selection and indication for sidelink DMRS bundling in a wireless communication system according to one or more aspects.
Figure 7:
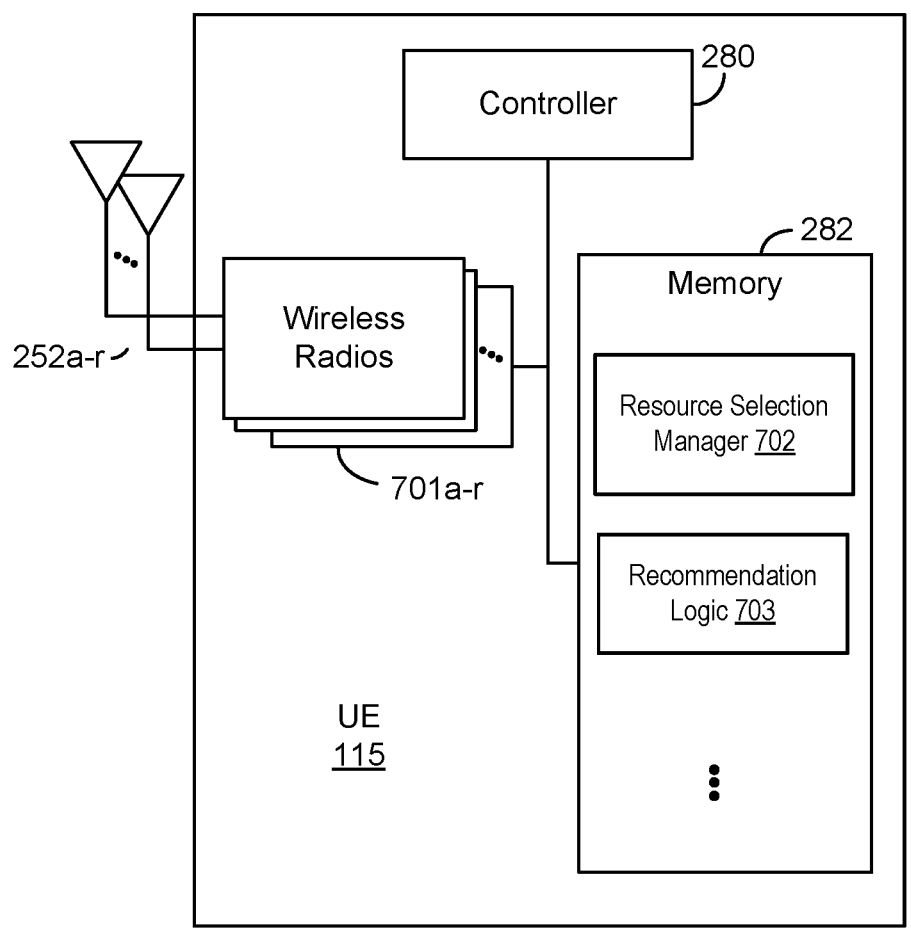
FIG. 7 is a block diagram of an example UE that supports resource selection and indication for sidelink DMRS bundling in a wireless communication system according to one or more aspects.

FIG. 4 is a flow diagram illustrating an example process 400 that supports resource selection and indication for sidelink DMRS bundling in a wireless communication system according to one or more aspects. Operations of process 400 may be performed by a UE, such as transmitting UE 115a described above with reference to FIGS. 1-3. For example, example operations (also referred to as "blocks") of process 400 may enable UE 115 to support resource selection and indication for sidelink DMRS bundling. FIG. 7 is a block diagram illustrating UE 115 configured according to aspects of the present disclosure. UE 115 includes the structure, hardware, and components as illustrated in FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 701a-r and antennas 252a-r. Wireless radios 701a-r includes various components and hardware, as illustrated in FIG. 2, including modulator/demodulators 254a-r, MIMO detector 256, receive processor 258, transmit processor 264, and TX MIMO processor 266.

At block 402 of process 400, a UE (e.g., UE 115 and/or transmitting UE 115a) determining a plurality of sidelink resources to be used for bundling a sidelink DMRS transmission to another UE. In order to implement the functionality for such operations, UE 115, under control of controller/processor 280, executes resource selection manager 802, stored in memory 282. The functionality implemented through the execution environment of resource selection manager 802 allows for UE 115 to perform operations for determining a plurality of sidelink resources to be used for bundling a sidelink DMRS transmission to another UE according to the various aspects herein. In aspects, UE 115 may perform operations to determine determining a plurality of sidelink resources to be used for bundling a sidelink DMRS transmission to another UE according to operations and functionality as described above with reference to transmitting UE 115a and as illustrated in FIG. 3.

At block 404 of process 400, UE 115 transmits an SCI message to the another UE including an indication of a DMRS bundling configuration used for the bundled sidelink DMRS transmission. In order to implement the functionality for such operations, UE 115, under control of controller/processor 280, may transmit the SCI message to the another UE including an indication of a DMRS bundling configuration used for the bundled sidelink DMRS transmission via wireless radios 701a-r and antennas 252a-r. In aspects, UE 115 may perform operations to transmit the SCI message to the another UE including an indication of a DMRS bundling configuration used for the bundled sidelink DMRS transmission according to operations and functionality as described above with reference to transmitting UE 115a and as illustrated in FIG. 3.

At block 406 of process 400, UE 115 transmits the bundled sidelink DMRS transmission to the another UE over the plurality of sidelink resources. In order to implement the functionality for such operations, UE 115, under control of controller/processor 280, may transmit the bundled sidelink DMRS transmission to the another UE over the plurality of sidelink resources via wireless radios 701a-r and antennas 252a-r. In aspects, UE 115 may perform operations to transmit the bundled sidelink DMRS transmission to the another UE over the plurality of sidelink resources according to operations and functionality as described above with reference to transmitting UE 115a and as illustrated in FIG. 3.

Figure 5:
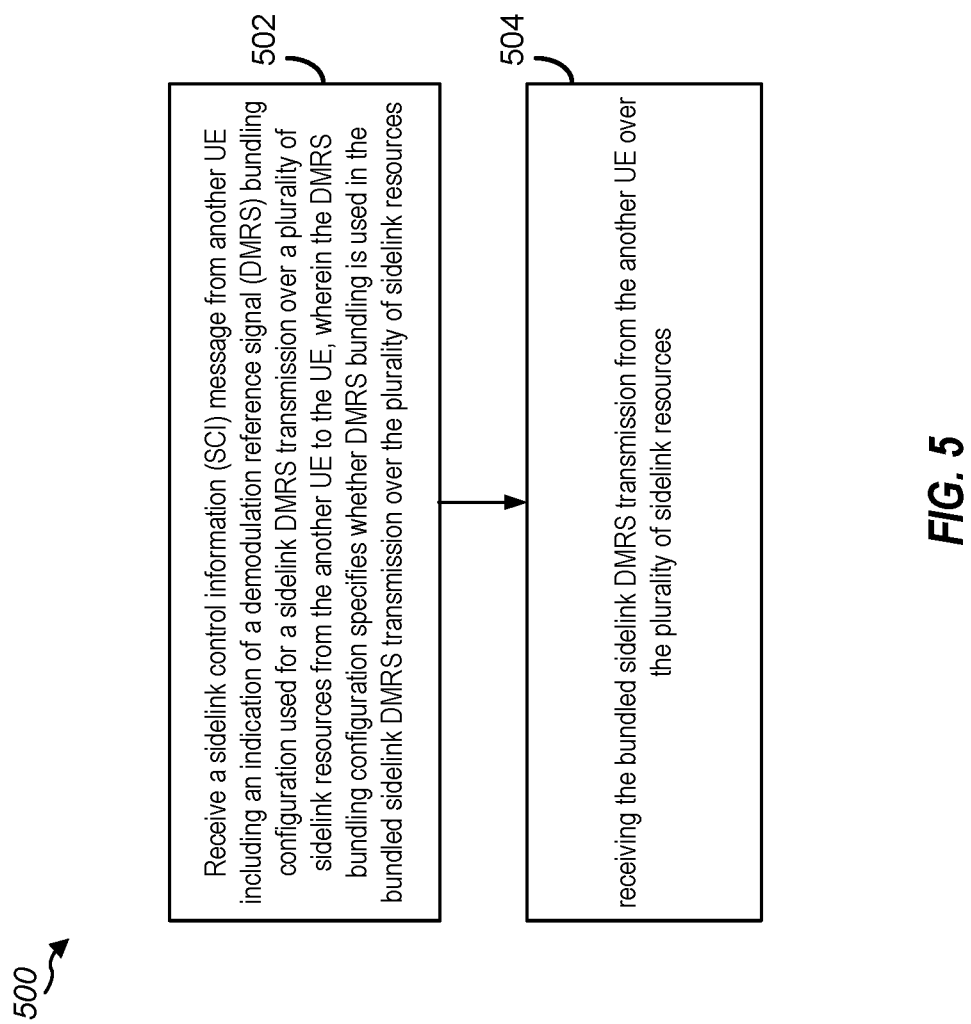
FIG. 5 is a flow diagram illustrating an example process that supports resource selection and indication for sidelink DMRS bundling in a wireless communication system according to one or more aspects.

FIG. 5 is a flow diagram illustrating an example process 500 that provides for resource selection and indication for sidelink DMRS bundling in a wireless communication system according to one or more aspects. Operations of process 500 may be performed by a UE, such as receiving UE 115b described above with reference to FIGS. 1-3. For example, example operations (also referred to as "blocks") of process 500 may enable UE 115 (e.g., UE 115 of FIG. 8) to support resource selection and indication for sidelink DMRS bundling in a wireless communication system according to one or more aspects.

At block 502 of process 500, a UE (e.g., UE 115 and/or receiving UE 115a) receives an SCI message from another UE including an indication of a DMRS bundling configuration used for a sidelink DMRS transmission over a plurality of sidelink resources from the another UE to the UE. In aspects, the DMRS bundling configuration specifies whether DMRS bundling is used in the bundled sidelink DMRS transmission over the plurality of sidelink resources. In order to implement the functionality for such operations, UE 115, under control of controller/processor 280, may receive the SCI message from another UE including an indication of a DMRS bundling configuration used for a sidelink DMRS transmission over a plurality of sidelink resources from the another UE to the UE via wireless radios 701a-r and antennas 252a-r. In aspects, UE 115 may perform operations to receive the SCI message from another UE including an indication of a DMRS bundling configuration used for a sidelink DMRS transmission over a plurality of sidelink resources from the another UE to the UE according to operations and functionality as described above with reference to receiving UE 115b and as illustrated in FIG. 3.

At block 504 of process 500, UE 115 receives the bundled sidelink DMRS transmission from the another UE over the plurality of sidelink resources. In order to implement the functionality for such operations, UE 115, under control of controller/processor 280, may receive the bundled sidelink DMRS transmission from the another UE over the plurality of sidelink resources via wireless radios 701a-r and antennas 252a-r. In aspects, UE 115 may perform operations to receive the bundled sidelink DMRS transmission from the another UE over the plurality of sidelink resources according to operations and functionality as described above with reference to receiving UE 115b and as illustrated in FIG. 3.

Figure 6:
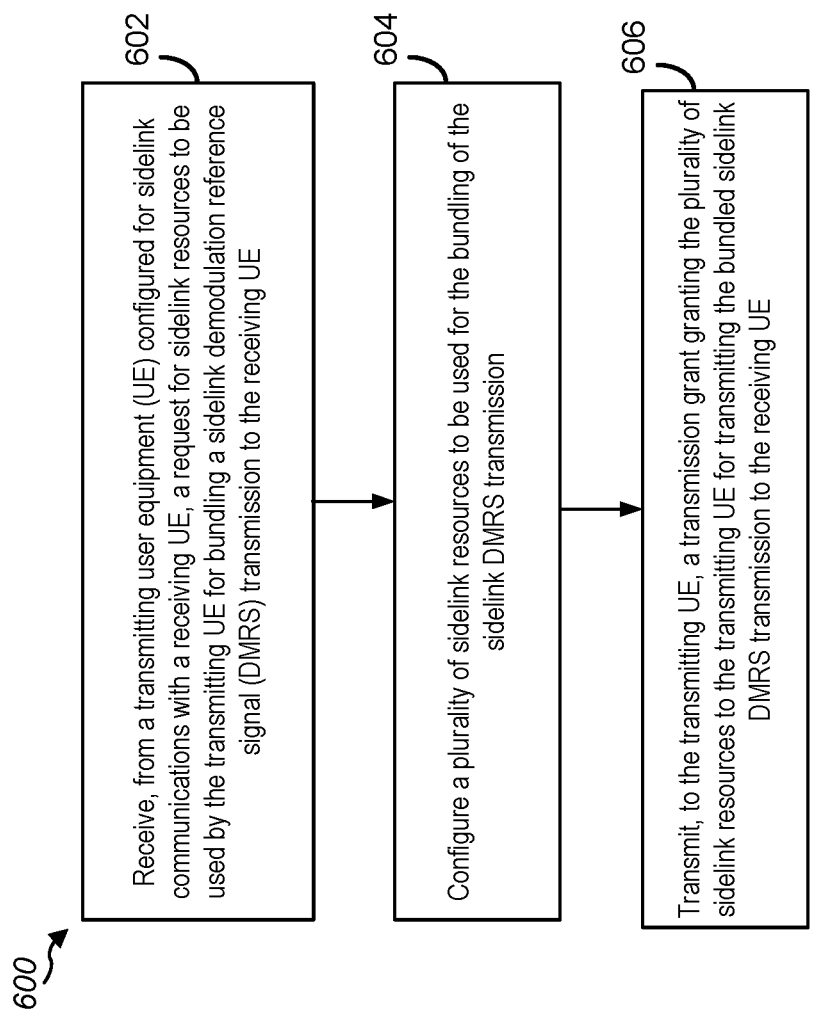
FIG. 6 is a flow diagram illustrating an example process that supports resource selection and indication for sidelink DMRS bundling in a wireless communication system according to one or more aspects.
Figure 8:
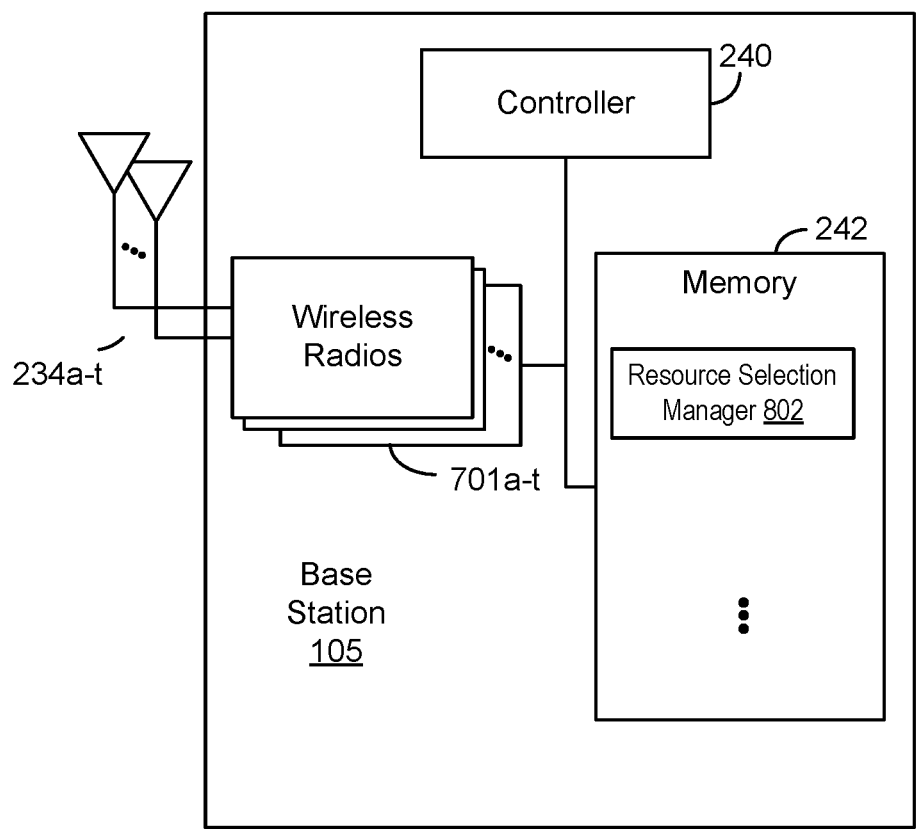
FIG. 8 is a block diagram of an example base station that supports resource selection and indication for sidelink DMRS bundling in a wireless communication system according to one or more aspects.

FIG. 6 is a block diagram illustrating an example an example process 600 that provides for resource selection and indication for sidelink DMRS bundling in a wireless communication system according to one or more aspects. Operations of process 600 may be performed by a base station, such as base station 105 described above with reference to FIGS. 1-3, or described with reference to FIG. 8. FIG. 8 is a block diagram illustrating base station 105 configured according to one aspect of the present disclosure. Base station 105 includes the structure, hardware, and components as illustrated for base station 105 of FIG. 2. For example, base station 105 includes controller/processor 240, which operates to execute logic or computer instructions stored in memory 242, as well as controlling the components of base station 105 that provide the features and functionality of base station 105. Base station 105, under control of controller/processor 240, transmits and receives signals via wireless radios 801a-t and antennas 234a-t. Wireless radios 801a-t includes various components and hardware, as illustrated in FIG. 2 for base station 105, including modulator/demodulators 232a-t, MIMO detector 236, receive processor 238, transmit processor 220, and TX MIMO processor 230.

At block 602 of process 600, a base station (e.g., base station 105) receives, from a transmitting UE configured for sidelink communications with a receiving UE, a request for sidelink resources to be used by the transmitting UE for bundling a sidelink DMRS transmission to the receiving UE. In order to implement the functionality for such operations, the base station, under control of controller/processor 240, may receive the request for sidelink resources to be used by the transmitting UE for bundling the sidelink DMRS transmission to the receiving UE via wireless radios 801a-r and antennas 234a-t. In aspects, base station 105 may perform operations to receive the the request for sidelink resources to be used by the transmitting UE for bundling the sidelink DMRS transmission to the receiving UE according to operations and functionality as described above with reference to base station 105 and as illustrated in FIG. 3.

At block 604 of process 600, base station 105 configuring a plurality of sidelink resources to be used for the bundling of the sidelink DMRS transmission. In order to implement the functionality for such operations, base station 105, under control of controller/processor 240, executes resource selection manager 802, stored in memory 242. The functionality implemented through the execution environment of resource selection manager 802 allows for base station 105 to perform operations to configure the plurality of sidelink resources to be used for the bundling of the sidelink DMRS transmission according to the various aspects herein. In aspects, base station 105 may perform operations to configure the plurality of sidelink resources to be used for the bundling of the sidelink DMRS transmission according to operations and functionality as described above with reference to base station 105 and as illustrated in FIG. 3.

At block 606 of process 600, base station 105 transmits, to the transmitting UE, a transmission grant granting the plurality of sidelink resources to the transmitting UE for transmitting the bundled sidelink DMRS transmission to the receiving UE. In order to implement the functionality for such operations, the base station, under control of controller/processor 240, may transmit, to the transmitting UE, the transmission grant granting the plurality of sidelink resources to the transmitting UE for transmitting the bundled sidelink DMRS transmission to the receiving UE via wireless radios 801a-r and antennas 234a-t. In aspects, base station 105 may perform operations to transmit the transmission grant granting the plurality of sidelink resources to the transmitting UE for transmitting the bundled sidelink DMRS transmission to the receiving UE according to operations and functionality as described above with reference to base station 105 and as illustrated in FIG. 3.

In one or more aspects, techniques for supporting resource selection and indication for sidelink DMRS bundling in a wireless communication system according to one or more aspects may include additional aspects, such as any single aspect or any combination of aspects described below or in connection with one or more other processes or devices described elsewhere herein. In a first aspect, supporting resource selection and indication for sidelink DMRS bundling in a wireless communication system may include an apparatus configured to determine a plurality of sidelink resources to be used for bundling a sidelink DMRS transmission to another UE, to transmit an SCI message to the another UE including an indication of a DMRS bundling configuration used for the bundled sidelink DMRS transmission, and to transmit the bundled sidelink DMRS transmission to the another UE over the plurality of sidelink resources. Additionally, the apparatus may perform or operate according to one or more aspects as described below. In some implementations, the apparatus includes a wireless device, such as a UE (e.g., a transmitting UE as described above). In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a second aspect, alone or in combination with the first aspect, determining the plurality of sidelink resources to be used for the bundled sidelink DMRS transmission includes transmitting request to a base station for sidelink resources configured to be used for bundling the sidelink DMRS transmission to the another UE.

In a third aspect, alone or in combination with the second aspect, determining the plurality of sidelink resources to be used for the bundled sidelink DMRS transmission includes receiving a transmission grant from the base station granting the sidelink resources configured to be used for bundling the sidelink DMRS transmission.

In a fourth aspect, alone or in combination with one or more of the second aspect through the third aspect, determining the plurality of sidelink resources to be used for the bundled sidelink DMRS transmission includes selecting the plurality of sidelink resources from the granted sidelink resources configured to be used for bundling the sidelink DMRS transmission to the another UE.

In a fifth aspect, alone or in combination with one or more of the first aspect through the fourth aspect, the request for sidelink resources configured to be used for bundling the sidelink DMRS transmission includes an indication of a maximum number of sidelink resources over which the sidelink DMRS transmission is to be bundled by the UE.

In a sixth aspect, alone or in combination with the fifth aspect, the request for sidelink resources configured to be used for bundling the sidelink DMRS transmission includes an indication of a phase continuity capability of the UE.

In a seventh aspect, alone or in combination with one or more of the sixth aspect through the sixth aspect, the phase continuity capability indicates a number of sidelink resources over which the UE is able to maintain phase continuity with respect to the bundled sidelink DMRS transmission.

In an eighth aspect, alone or in combination with one or more of the first aspect through the seventh aspect, the request for sidelink resources configured to be used for bundling the sidelink DMRS transmission is transmitted to the base station in a BSR.

In a ninth aspect, alone or in combination with one or more of the first aspect through the eighth aspect, the transmission grant includes an indication to the UE to maintain phase continuity over the transmitting of the bundled sidelink DMRS transmission to the another UE over the plurality of sidelink resources.

In a tenth aspect, alone or in combination with the ninth aspect, the transmission grant includes an indication to the UE to include a phase jump reference signal in the DMRS bundling configuration to be used by the another UE to estimate a phase jump associated with the bundled sidelink DMRS transmission.

In an eleventh aspect, alone or in combination with one or more of the first aspect through the tenth aspect, determining the plurality of sidelink resources to be used for the bundled sidelink DMRS transmission includes receiving, from the another UE, a recommendation of one or more sidelink resources configured to be used by the another UE to receive the bundled sidelink DMRS transmission.

In a twelfth aspect, alone or in combination with the eleventh aspect, determining the plurality of sidelink resources to be used for the bundled sidelink DMRS transmission includes selecting the plurality of sidelink resources to be used for the bundled sidelink DMRS transmission based, at least in part, on the recommendation of the one or more sidelink resources configured to be used by the another UE to receive the bundled sidelink DMRS transmission.

In a thirteenth aspect, alone or in combination with one or more of the first aspect through the twelfth aspect, receiving the recommendation of the one or more sidelink resources configured to be used by the another UE to receive the bundled sidelink DMRS transmission includes receiving an indication of sidelink resources of the one or more sidelink resources that are able to be used by the another UE to receive the bundled sidelink DMRS transmission with phase continuity, and/or an indication of sidelink resources of the one or more sidelink resources that are not able to be used by the another UE to receive the bundled sidelink DMRS transmission with phase continuity.

In a fourteenth aspect, alone or in combination with one or more of the first aspect through the thirteenth aspect, selecting the plurality of sidelink resources to be used for the bundled sidelink DMRS transmission includes including, based on the indication that the sidelink resources of the one or more sidelink resources are not able to be used by the another UE to receive the bundled sidelink DMRS transmission with phase continuity, a phase jump reference signal in the DMRS bundling configuration, the phase jump reference signal configured to be used by the another UE to estimate a phase jump associated with the bundled sidelink DMRS transmission over the plurality of sidelink resources.

In a fifteenth aspect, alone or in combination with one or more of the first aspect through the fourteenth aspect, selecting the plurality of sidelink resources to be used for the bundled sidelink DMRS transmission is further based on sensing performed by the UE on a transmission channel associated with the bundled sidelink DMRS transmission.

In a sixteenth aspect, alone or in combination with the fifteenth aspect, selecting the plurality of sidelink resources to be used for the bundled sidelink DMRS transmission is further based on a phase continuity capability of the UE, wherein the phase continuity capability indicates a number of sidelink resources over which the UE is able to maintain phase continuity with respect to the bundled sidelink DMRS transmission.

In a seventeenth aspect, alone or in combination with one or more of the first aspect through the sixteenth aspect, determining the plurality of sidelink resources to be used for the bundled sidelink DMRS transmission includes sensing a transmission channel associated with the bundled sidelink DMRS transmission.

In an eighteenth aspect, alone or in combination with the seventeenth aspect, determining the plurality of sidelink resources to be used for the bundled sidelink DMRS transmission includes selecting the plurality of sidelink resources based, at least in part, on the sensing transmission channel associated with the bundled sidelink DMRS transmission, and/or a phase continuity capability of the UE or a phase continuity capability of the another UE.

In a nineteenth aspect, alone or in combination with one or more of the seventeenth aspect through the eighteenth aspect, the phase continuity capability of the UE indicates a number of sidelink resources over which the UE is able to maintain phase continuity with respect to the transmitting the bundled sidelink DMRS transmission to the another UE.

In a twentieth aspect, alone or in combination with one or more of the seventeenth aspect through the nineteenth aspect, the phase continuity capability of the another UE indicates a number of sidelink resources over which the another UE is able to maintain phase continuity with respect to receiving the bundled sidelink DMRS transmission from the UE.

In a twenty-first aspect, alone or in combination with one or more of the first aspect through the twentieth aspect, the SCI message to the another UE includes an indication that the sidelink DMRS transmission is bundled over the plurality of resources.

In a twenty-second aspect, alone or in combination with the twenty-first aspect, the SCI message to the another UE includes an indication that phase continuity is maintained by the UE over the transmitting of the bundled sidelink DMRS transmission to the another UE over the plurality of sidelink resources, and/or an indication that a phase jump reference signal is included in the DMRS bundling configuration to be used by the another UE to estimate a phase jump associated with the bundled sidelink DMRS transmission.

In a twenty-third aspect, alone or in combination with one or more of the first aspect through the twenty-second aspect, the SCI message to the another UE further includes a commitment indication by the UE to maintain phase continuity over the bundled sidelink DMRS transmission over the plurality of sidelink resources by refraining from changing an RF configuration during the bundled sidelink DMRS transmission over the plurality of sidelink resources.

In a twenty-fourth aspect, alone or in combination with one or more of the first aspect through the twenty-third aspect, the bundled sidelink DMRS transmission is transmitted to the another UE with a PSSCH transmission, the SCI message including control information for the PSSCH transmission.

In a twenty-fifth aspect, alone or in combination with the twenty-fourth aspect, the bundled sidelink DMRS transmission is transmitted to the another UE with a PSCCH transmission including the SCI message.

In a twenty-sixth aspect, techniques for supporting resource selection and indication for sidelink DMRS bundling in a wireless communication system may include an apparatus configured to receive an SCI message from another UE including an indication of a DMRS bundling configuration used for a sidelink DMRS transmission over a plurality of sidelink resources from the another UE to the UE. In this aspect, the DMRS bundling configuration specifies whether DMRS bundling is used in the bundled sidelink DMRS transmission over the plurality of sidelink resources. The apparatus is further configured to receive the bundled sidelink DMRS transmission from the another UE over the plurality of sidelink resources. Additionally, the apparatus may perform or operate according to one or more aspects as described below. In some implementations, the apparatus includes a wireless device, such as a UE (e.g., a receiving UE as described above). In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a twenty-seventh aspect, alone or in combination with one or more of the twenty-sixth aspect through the twenty-sixth aspect, the techniques of the twenty-sixth aspect include receiving, from a base station, a reception grant indicating the plurality of sidelink resources over which the bundled sidelink DMRS transmission is to be received from the another UE.

In a twenty-eighth aspect, alone or in combination with one or more of the twenty-sixth aspect through the twenty-seventh aspect, the reception grant includes an indication to the UE that the bundled sidelink DMRS transmission to be received by the UE from the another UE is bundled over the plurality of sidelink resources.

In a twenty-ninth aspect, alone or in combination with one or more of the twenty-sixth aspect through the twenty-eighth aspect, the techniques of the twenty-sixth aspect include transmitting, to the another UE, a recommendation of one or more sidelink resources configured to be used by the UE to receive the bundled sidelink DMRS transmission from the another UE.

In a thirtieth aspect, alone or in combination with the twenty-ninth aspect, the another UE selects the plurality of sidelink resources based, at least in part, on the recommendation of the one or more sidelink resources by the UE.

In a thirty-first aspect, alone or in combination with one or more of the twenty-sixth aspect through the thirtieth aspect, recommendation transmitted to the another UE includes an indication of sidelink resources of the one or more sidelink resources that are able to be used by the UE to receive the bundled sidelink DMRS transmission with phase continuity.

In a thirty-second aspect, alone or in combination with the thirty-first aspect, recommendation transmitted to the another UE includes an indication of sidelink resources of the one or more sidelink resources that are not able to be used by the UE to receive the bundled sidelink DMRS transmission with phase continuity.

In a thirty-third aspect, alone or in combination with one or more of the twenty-sixth aspect through the thirty-second aspect, the DMRS bundling configuration includes a phase jump reference signal in the DMRS bundling configuration.

In a thirty-fourth aspect, alone or in combination with the thirty-third aspect, the techniques of the twenty-sixth aspect include estimating, based on the phase jump reference signal, a phase jump associated with the bundled sidelink DMRS transmission over the plurality of sidelink resources.

In a thirty-fifth aspect, alone or in combination with one or more of the twenty-sixth aspect through the thirty-fourth aspect, the techniques of the twenty-sixth aspect include transmitting, to the another UE, a phase continuity capability of the UE.

In a thirty-sixth aspect, alone or in combination with the thirty-fifth aspect, the phase continuity capability of the UE indicates a number of sidelink resources over which the UE is able to maintain phase continuity with respect to receiving the bundled sidelink DMRS transmission from the another UE.

In a thirty-seventh aspect, alone or in combination with one or more of the thirty-fifth aspect through the thirty-sixth aspect, the another UE is configured to determine the plurality of sidelink resources to be used for the bundled sidelink DMRS transmission based, at least in part, on the phase continuity capability of the UE.

In a thirty-eighth aspect, alone or in combination with one or more of the twenty-sixth aspect through the thirty-seventh aspect, the SCI message from the another UE includes an indication that the sidelink DMRS transmission is bundled over the plurality of resources.

In a thirty-ninth aspect, alone or in combination with the thirty-eighth aspect, the SCI message from the another UE includes an indication that phase continuity is maintained by the another UE over the transmitting of the bundled sidelink DMRS transmission to the UE over the plurality of sidelink resources, and/or an indication that a phase jump reference signal is included in the DMRS bundling configuration to be used by the UE to estimate a phase jump associated with the bundled sidelink DMRS transmission.

In a fortieth aspect, alone or in combination with one or more of the twenty-sixth aspect through the thirty-ninth aspect, the SCI message from the another UE further includes a commitment indication by the another UE to maintain phase continuity over the bundled sidelink DMRS transmission over the plurality of sidelink resources by refraining from changing an RF configuration during the bundled sidelink DMRS transmission over the plurality of sidelink resources.

In a forty-first aspect, alone or in combination with one or more of the twenty-sixth aspect through the fortieth aspect, the bundled sidelink DMRS transmission is received from the another UE with a PSSCH transmission, the SCI message including control information for the PSSCH transmission.

In a forty-second aspect, alone or in combination with the forty-first aspect, the bundled sidelink DMRS transmission is received from the another UE with a PSCCH transmission including the SCI message.

In a forty-third aspect, alone or in combination with one or more of the twenty-sixth aspect through the forty-second aspect, the techniques of the twenty-sixth aspect include foregoing to receive the bundled sidelink DMRS transmission over the plurality of sidelink resources.

In a forty-fourth aspect, alone or in combination with the forty-third aspect, foregoing to receive the bundled sidelink DMRS transmission includes receiving a single sidelink DMRS transmission over single sidelink resource of the plurality of sidelink resources.

In a forty-fifth aspect, techniques for supporting resource selection and indication for sidelink DMRS bundling in a wireless communication system may include an apparatus configured to receive, from a transmitting UE configured for sidelink communications with a receiving UE, a request for sidelink resources to be used by the transmitting UE for bundling a sidelink DMRS transmission to the receiving UE, to configure a plurality of sidelink resources to be used for the bundling of the sidelink DMRS transmission, and to transmit, to the transmitting UE, a transmission grant granting the plurality of sidelink resources to the transmitting UE for transmitting the bundled sidelink DMRS transmission to the receiving UE. Additionally, the apparatus may perform or operate according to one or more aspects as described below. In some implementations, the apparatus includes a wireless device, such as a base station. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a forty-sixth aspect, alone or in combination with one or more of the first aspect through the forty-fifth aspect, the techniques of the forty-fifth aspect include transmitting, to the receiving UE, a reception grant indicating the plurality of sidelink resources for the receiving UE to receive the bundled sidelink DMRS transmission from the transmitting UE.

In a forty-seventh aspect, alone or in combination with one or more of the forty-fifth aspect through the forty-sixth aspect, the reception grant includes an indication to the receiving UE that the bundled sidelink DMRS transmission to be received by the receiving UE from the transmitting UE is bundled over the plurality of sidelink resources.

In a forty-eighth aspect, alone or in combination with one or more of the forty-fifth aspect through the forty-seventh aspect, the request for sidelink resources to be used for bundling the sidelink DMRS transmission includes an indication by the transmitting UE of a maximum number of sidelink resources over which the sidelink DMRS transmission is to be bundled by the transmitting UE.

In a forty-ninth aspect, alone or in combination with the forty-eighth aspect, the request for sidelink resources to be used for bundling the sidelink DMRS transmission includes an indication by the transmitting UE of a phase continuity capability of the transmitting UE.

In a fiftieth aspect, alone or in combination with one or more of the forty-eighth aspect through the forty-ninth aspect, the phase continuity capability indicates a number of sidelink resources over which the transmitting UE is able to maintain phase continuity with respect to the bundled sidelink DMRS transmission.

In a fifty-first aspect, alone or in combination with one or more of the forty-fifth aspect through the fiftieth aspect, the request for sidelink resources to be used for bundling the sidelink DMRS transmission is received from the transmitting UE in a BSR.

In a fifty-second aspect, alone or in combination with one or more of the forty-fifth aspect through the fifty-first aspect, the transmission grant includes an indication to the transmitting UE to maintain phase continuity over the bundled sidelink DMRS transmission to the receiving UE over the plurality of sidelink resources.

In a fifty-third aspect, alone or in combination with the fifty-second aspect, the transmission grant includes an indication to the transmitting UE to include a phase jump reference signal in the DMRS bundling configuration to be used by the receiving UE to estimate a phase jump associated with the bundled sidelink DMRS transmission.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-8 include processors, electronics devices, hardware devices, electronics components, logical circuits, memories, software codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, software, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication performed by a user equipment (UE), the method comprising:
    determining a plurality of sidelink resources of a sidelink demodulation reference signal (DMRS) window to be used for bundling a sidelink DMRS transmission to another UE, wherein the sidelink DMRS window includes a plurality of slots over which a plurality of instances of a same sidelink DMRS symbol are transmitted as a bundled sidelink DMRS transmission;
    transmitting a sidelink control information (SCI) message to the another UE including an indication of a DMRS bundling configuration used for the bundled sidelink DMRS transmission; and
    transmitting the plurality of instances of the same sidelink DMRS symbol of the bundled sidelink DMRS transmission to the another UE over the plurality of sidelink resources of the sidelink DMRS window.

2. The method of claim 1, wherein determining the plurality of sidelink resources of the sidelink DMRS window to be used for the bundled sidelink DMRS transmission includes:
    transmitting a request to a base station for sidelink resources configured to be used for bundling the sidelink DMRS transmission to the another UE;
    receiving a transmission grant from the base station granting the sidelink resources configured to be used for bundling the sidelink DMRS transmission; and
    selecting the plurality of sidelink resources of the sidelink DMRS window from granted sidelink resources configured to be used for bundling the sidelink DMRS transmission to the another UE.

3. The method of claim 2, wherein the request for sidelink resources configured to be used for bundling the sidelink DMRS transmission includes one or more of:
    an indication of a maximum number of sidelink resources of the sidelink DMRS window over which the sidelink DMRS transmission is to be bundled by the UE; or
    an indication of a phase continuity capability of the UE, wherein the phase continuity capability indicates a number of sidelink resources over which the UE is able to maintain phase continuity with respect to the bundled sidelink DMRS transmission.

4. The method of claim 2, wherein the request for sidelink resources configured to be used for bundling the sidelink DMRS transmission is transmitted to the base station in a buffer status report (BSR).

5. The method of claim 2, wherein the transmission grant includes one or more of:
    an indication to the UE to maintain phase continuity over the transmitting of the bundled sidelink DMRS transmission to the another UE over the plurality of sidelink resources of the sidelink DMRS window; or
    an indication to the UE to include a phase jump reference signal in the DMRS bundling configuration to be used by the another UE to estimate a phase jump associated with the bundled sidelink DMRS transmission.

6. The method of claim 1, wherein determining the plurality of sidelink resources of the sidelink DMRS window to be used for the bundled sidelink DMRS transmission includes:
    receiving, from the another UE, a recommendation of one or more sidelink resources configured to be used by the another UE to receive the bundled sidelink DMRS transmission; and
    selecting the plurality of sidelink resources of the sidelink DMRS window to be used for the bundled sidelink DMRS transmission based, at least in part, on the recommendation of the one or more sidelink resources configured to be used by the another UE to receive the bundled sidelink DMRS transmission.

7. The method of claim 6, wherein receiving the recommendation of the one or more sidelink resources configured to be used by the another UE to receive the bundled sidelink DMRS transmission includes receiving one or more of:
    an indication of sidelink resources of the one or more sidelink resources that are able to be used by the another UE to receive the bundled sidelink DMRS transmission with phase continuity; or
    an indication of sidelink resources of the one or more sidelink resources that are not able to be used by the another UE to receive the bundled sidelink DMRS transmission with phase continuity.

8. The method of claim 7, wherein selecting the plurality of sidelink resources of the sidelink DMRS window to be used for the bundled sidelink DMRS transmission includes:
    including, based on the indication that the sidelink resources of the one or more sidelink resources are not able to be used by the another UE to receive the bundled sidelink DMRS transmission with phase continuity, a phase jump reference signal in the DMRS bundling configuration, the phase jump reference signal configured to be used by the another UE to estimate a phase jump associated with the bundled sidelink DMRS transmission over the plurality of sidelink resources of the sidelink DMRS window.

9. The method of claim 6, wherein selecting the plurality of sidelink resources of the sidelink DMRS window to be used for the bundled sidelink DMRS transmission is further based on one or more of:
    sensing performed by the UE on a transmission channel associated with the bundled sidelink DMRS transmission; or
    a phase continuity capability of the UE, wherein the phase continuity capability indicates a number of sidelink resources over which the UE is able to maintain phase continuity with respect to the bundled sidelink DMRS transmission.

10. The method of claim 1, wherein determining the plurality of sidelink resources of the sidelink DMRS window to be used for the bundled sidelink DMRS transmission includes:
    sensing a transmission channel associated with the bundled sidelink DMRS transmission;
    selecting the plurality of sidelink resources of the sidelink DMRS window based, at least in part, on or more of:
        the sensing the transmission channel associated with the bundled sidelink DMRS transmission;
        a phase continuity capability of the UE, wherein the phase continuity capability of the UE indicates a number of sidelink resources over which the UE is able to maintain phase continuity with respect to the transmitting the bundled sidelink DMRS transmission to the another UE; or a phase continuity capability of the another UE, wherein the phase continuity capability of the another UE indicates a number of sidelink resources over which the another UE is able to maintain phase continuity with respect to receiving the bundled sidelink DMRS transmission from the UE.

11. The method of claim 1, wherein the SCI message to the another UE includes one or more of:

an indication that the sidelink DMRS transmission is bundled over the plurality of sidelink resources of the sidelink DMRS window; or an indication that one or more of:

phase continuity is maintained by the UE over the transmitting of the bundled sidelink DMRS transmission to the another UE over the plurality of sidelink resources of the sidelink DMRS window; or a phase jump reference signal is included in the DMRS bundling configuration to be used by the another UE to estimate a phase jump associated with the bundled sidelink DMRS transmission.

12. The method of claim 11, wherein the SCI message to the another UE further includes:

a commitment indication by the UE to maintain phase continuity over the bundled sidelink DMRS transmission over the plurality of sidelink resources of the sidelink DMRS window by refraining from changing a radio frequency (RF) configuration during the bundled sidelink DMRS transmission over the plurality of sidelink resources of the sidelink DMRS window.

13. The method of claim 1, wherein the bundled sidelink DMRS transmission is transmitted to the another UE with one or more of:

a physical sidelink shared channel (PSSCH) transmission, wherein the SCI message includes control information for the PSSCH transmission;

a physical sidelink control channel (PSCCH) transmission including the SCI message.

14. A method of wireless communication performed by a user equipment (UE), the method comprising:

receiving a sidelink control information (SCI) message from another UE including an indication of a demodulation reference signal (DMRS) bundling configuration used for a bundled sidelink DMRS transmission over a plurality of sidelink resources of a sidelink DMRS window to be used for bundling of the bundled sidelink DMRS transmission from the another UE to the UE, wherein the DMRS bundling configuration specifies whether DMRS bundling is used in the bundled sidelink DMRS transmission over the plurality of sidelink resources of the sidelink DMRS window, wherein the sidelink DMRS window includes a plurality of slots over which a plurality of instances of a same sidelink DMRS symbol are transmitted as the bundled sidelink DMRS transmission; and receiving the plurality of instances of the same sidelink DMRS symbol of the bundled sidelink DMRS transmission from the another UE over the plurality of sidelink resources of the sidelink DMRS window.

15. The method of claim 14, further comprising:
receiving, from a base station, a reception grant indicating the plurality of sidelink resources of the sidelink DMRS window over which the bundled sidelink DMRS transmission is to be received from the another UE.

16. The method of claim 15 wherein the reception grant includes an indication to the UE that the bundled sidelink DMRS transmission to be received by the UE from the another UE is bundled over the plurality of sidelink resources of the sidelink DMRS window.

17. The method of claim 14, further comprising:
transmitting, to the another UE, a recommendation of one or more sidelink resources configured to be used by the UE to receive the bundled sidelink DMRS transmission from the another UE, wherein the another UE selects the plurality of sidelink resources of the sidelink DMRS window based, at least in part, on the recommendation of the one or more sidelink resources by the UE.

18. The method of claim 17, wherein the recommendation transmitted to the another UE includes one or more of:

an indication of sidelink resources of the one or more sidelink resources that are able to be used by the UE to receive the bundled sidelink DMRS transmission with phase continuity; or an indication of sidelink resources of the one or more sidelink resources that are not able to be used by the UE to receive the bundled sidelink DMRS transmission with phase continuity.

19. The method of claim 18, wherein the DMRS bundling configuration includes a phase jump reference signal in the DMRS bundling configuration, and further comprising:

estimating, based on the phase jump reference signal, a phase jump associated with the bundled sidelink DMRS transmission over the plurality of sidelink resources of the sidelink DMRS window.

20. The method of claim 14, further comprising:
transmitting, to the another UE, a phase continuity capability of the UE, wherein the phase continuity capability of the UE indicates a number of sidelink resources over which the UE is able to maintain phase continuity with respect to receiving the bundled sidelink DMRS transmission from the another UE, wherein the another UE is configured to determine the plurality of sidelink resources of the sidelink DMRS window to be used for the bundled sidelink DMRS transmission based, at least in part, on the phase continuity capability of the UE.

21. The method of claim 14, wherein the SCI message from the another UE includes one or more of:

an indication that the bundled sidelink DMRS transmission is bundled over the plurality of sidelink resources; or an indication that one or more of:

phase continuity is maintained by the another UE over the bundled sidelink DMRS transmission to the UE over the plurality of sidelink resources of the sidelink DMRS window; or a phase jump reference signal is included in the DMRS bundling configuration to be used by the UE to estimate a phase jump associated with the bundled sidelink DMRS transmission.

22. The method of claim 21, wherein the SCI message from the another UE further includes:

a commitment indication by the another UE to maintain phase continuity over the bundled sidelink DMRS transmission over the plurality of sidelink resources of the sidelink DMRS window by refraining from changing a radio frequency (RF) configuration during the bundled sidelink DMRS transmission over the plurality of sidelink resources of the sidelink DMRS window.

23. The method of claim 14, wherein the bundled sidelink DMRS transmission is received from the another UE with one or more of:
- a physical sidelink shared channel (PSSCH) transmission, wherein the SCI message includes control information for the PSSCH transmission;
- a physical sidelink control channel (PSCCH) transmission including the SCI message.

24. The method of claim 14, further comprising:
foregoing to receive the bundled sidelink DMRS transmission over the plurality of sidelink resources of the sidelink DMRS window, wherein foregoing to receive the bundled sidelink DMRS transmission includes receiving a single sidelink DMRS transmission over a single sidelink resource of the plurality of sidelink resources of the sidelink DMRS window.

25. A method of wireless communication performed by a base station, the method comprising:
- receiving, from a transmitting user equipment (UE) configured for sidelink communications with a receiving UE, a request for sidelink resources to be used by the transmitting UE for bundling a sidelink demodulation reference signal (DMRS) transmission to the receiving UE;
- configuring a plurality of sidelink resources of a sidelink DMRS window to be used for the bundling of the sidelink DMRS transmission, wherein the sidelink DMRS window includes a plurality of slots over which a plurality of instances of a same sidelink DMRS symbol are transmitted as a bundled sidelink DMRS transmission; and
- transmitting, to the transmitting UE, a transmission grant granting the plurality of sidelink resources to the transmitting UE for transmitting the bundled sidelink DMRS transmission to the receiving UE.

26. The method of claim 25, further comprising:
transmitting, to the receiving UE, a reception grant including the plurality of sidelink resources of the sidelink DMRS window for the receiving UE to receive the bundled sidelink DMRS transmission from the transmitting UE.

27. The method of claim 26 wherein the reception grant includes an indication to the receiving UE that the bundled sidelink DMRS transmission to be received by the receiving UE from the transmitting UE is bundled over the plurality of sidelink resources of the sidelink DMRS window.

28. The method of claim 26, wherein the request for sidelink resources to be used for bundling the sidelink DMRS transmission includes one or more of:
- an indication by the transmitting UE of a maximum number of sidelink resources over which the sidelink DMRS transmission is to be bundled by the transmitting UE; or
- an indication by the transmitting UE of a phase continuity capability of the transmitting UE, wherein the phase continuity capability indicates a number of sidelink resources over which the transmitting UE is able to maintain phase continuity with respect to the bundled sidelink DMRS transmission.

29. The method of claim 25, wherein the request for sidelink resources to be used for bundling the sidelink DMRS transmission is received from the transmitting UE in a buffer status report (BSR).

30. The method of claim 25, wherein the transmission grant includes one or more of:
- an indication to the transmitting UE to maintain phase continuity over the bundled sidelink DMRS transmission to the receiving UE over the plurality of sidelink resources of the sidelink DMRS window; or
- an indication to the transmitting UE to include a phase jump reference signal in the DMRS bundling configuration to be used by the receiving UE to estimate a phase jump associated with the bundled sidelink DMRS transmission.

* * * * *